July 17, 1962 K. C. ALLEN 3,045,229

WEIGHING SCALES

Filed Feb. 1, 1957 30 Sheets-Sheet 1

*INVENTOR.*

KENNETH C. ALLEN

*BY*

Marechal, Biebel, French & Bugg

ATTORNEYS

July 17, 1962 K. C. ALLEN 3,045,229

WEIGHING SCALES

Filed Feb. 1, 1957 30 Sheets-Sheet 2

INVENTOR.
KENNETH C. ALLEN
BY
Marechal, Biebel, French & Bugg
ATTORNEYS

July 17, 1962 K. C. ALLEN 3,045,229

WEIGHING SCALES

Filed Feb. 1, 1957 30 Sheets-Sheet 3

INVENTOR.
KENNETH C. ALLEN
BY
Marechal, Biebel, French & Bugg
ATTORNEYS

WEIGHING SCALES

Filed Feb. 1, 1957 30 Sheets-Sheet 4

INVENTOR.
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

July 17, 1962 K. C. ALLEN 3,045,229

WEIGHING SCALES

Filed Feb. 1, 1957 30 Sheets-Sheet 6

INVENTOR

KENNETH C. ALLEN

BY

Marechal, Biebel, French & Bugg

ATTORNEYS

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

July 17, 1962 K. C. ALLEN 3,045,229

WEIGHING SCALES

Filed Feb. 1, 1957 30 Sheets-Sheet 9

INVENTOR
KENNETH C. ALLEN

BY

Marichal, Biebel, French & Bugg
ATTORNEYS

July 17, 1962 K. C. ALLEN 3,045,229

WEIGHING SCALES

Filed Feb. 1, 1957 30 Sheets-Sheet 10

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

July 17, 1962 K. C. ALLEN 3,045,229

WEIGHING SCALES

Filed Feb. 1, 1957 30 Sheets-Sheet 14

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

July 17, 1962 K. C. ALLEN 3,045,229

WEIGHING SCALES

Filed Feb. 1, 1957 30 Sheets-Sheet 16

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

INVENTOR
KENNETH C. ALLEN
BY Marechal, Biebel, French & Bugg
ATTORNEYS

INVENTOR
KENNETH C. ALLEN
BY
Marechal, Biebel, French & Bugg
ATTORNEYS

July 17, 1962 K. C. ALLEN 3,045,229

WEIGHING SCALES

Filed Feb. 1, 1957 30 Sheets-Sheet 20

INVENTOR
KENNETH C. ALLEN
BY
Marechal, Biebel, French & Bugg
ATTORNEYS

July 17, 1962 K. C. ALLEN 3,045,229

WEIGHING SCALES

Filed Feb. 1, 1957 30 Sheets-Sheet 21

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

INVENTOR
KENNETH C. ALLEN
BY
Marechal, Biebel, French & Bugg
ATTORNEYS

July 17, 1962 K. C. ALLEN 3,045,229

WEIGHING SCALES

Filed Feb. 1, 1957 30 Sheets-Sheet 29

INVENTOR
KENNETH C. ALLEN

BY

Marechal, Biebel, French & Bugg

ATTORNEYS

*INVENTOR.*
KENNETH C. ALLEN
*BY*
*Marechal, Biebel, French & Bugg*
ATTORNEYS

United States Patent Office 3,045,229

Patented July 17, 1962

3,045,229
WEIGHING SCALES

Kenneth C. Allen, Dayton, Ohio, assignor to The Hobart Manufacturing Company, Troy, Ohio, a corporation of Ohio Filed Feb. 1, 1957, Ser. No. 637,725
8 Claims. (Cl. 340—347)

This invention relates to weighing scales, and more particularly to power operated weighing scales.

The invention has special relation to a power operated weighing system which includes both a powered weighing mechanism and also apparatus responsive to the operation of the weighing mechanism for computing the value of successive weighed articles and for issuing printed tickets identifying the weight, unit price and value of the articles. A system of this type is particularly useful in food stores for prepackaging operations wherein a series of successive packages or articles of food commodities are weighed and then labeled with a printed ticket identifying the commodity together with its weight, unit price and value. Such systems are disclosed in a series of copending applications identified as cases A to F inclusive in accordance with the index table at the end of this specification, all of which are assigned to the assignee of the present application, and further reference to those applications will be found hereinafter.

One of the objects of the present invention is to provide a power operated scale which is of simple and rugged structure, which will operate at high speed with great accuracy, and especially which is constructed to minimize the development of stresses or strains capable of adversely affecting the speed or accuracy thereof even after extended use.

Another object of the invention is to provide a power operated scale which includes novel switch mechanisms for reading out the balance position of the scale and particularly wherein such switch mechanisms include cooperating relays for quickly and accurately storing data representing the balance position of the scale.

An additional object of the invention is to provide a read out switch mechanism adapted for use in a power operated scale which incorporates simple and reliable circuit arrangements for assuring that the proper one of any pair of bridged contacts or of a pair of wipers engaging different contacts will control the data transmitted by the switch mechanism.

More specifically, the invention has relation to switch mechanisms for use in reading out a multi-digit value such as weight in a power operated scale and composed of digits arranged in a series of positions including a lower order and at least one higher order, and it is an object of the invention to provide a switch mechanism for reading out the lowest order position in such multi-digit order wherein a wiper member moves into engagement with successive contacts in such manner as to bridge each successive pair of contacts before leaving the lower thereof and wherein the circuits are so arranged that whenever this wiper member is in such bridging engagement with a pair of contacts, the higher of the bridged contacts will determine the digit to appear in the corresponding position.

It is also an object of the invention to provide a read-out switch mechanism for reading out each higher order position in a multi-digit value as outlined above wherein a pair of wipers moves in respectively leading or lagging relation into engagement with successive contacts and wherein the circuits are so arranged that whenever both such wipers are in engagement with different ones of a pair of contacts, the selection of which wiper is connected in the output circuit of the switch is determined by the value of the digit in the next lower order position of the multi-digit value.

A specific object of the invention is to provide a read-out switch mechanism as outlined in the next preceding paragraph wherein the circuits are such that the leading wiper is made effective whenever the digit in the next lower position is in the lower half of its range of values and the lagging wiper is made effective whenever the digit in the next lower position is in the upper half of its range of values.

A further object of the invention is to provide computing apparatus adapted for incorporation in a power operated weighing system as outlined above wherein the multiplication, addition and storage functions are carried out by a series of relays operating in predetermined sequence in accordance with factors supplied thereto by means such as manual selector switches representing price and read-out switches representing weight.

A still further object of the invention is to provide computing apparatus incorporating relays as outlined above wherein operation of the apparatus at a plurality of stages is protected against error by means of a guarding relay which must operate before the remainder of the system can continue operation and which is prevented from operation until after all preceding relays which should have been operated have done so.

Other objects and advantages of the invention will be apparent from the following description, the accompanying drawings and the appended claims.

In the drawings—

Figure 1:
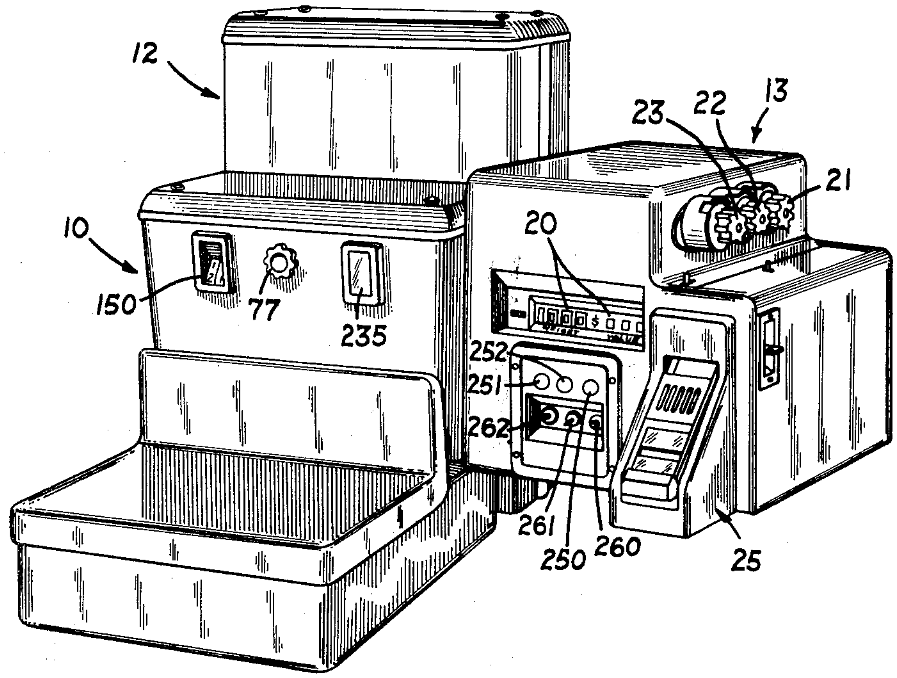
FIG. 1 is a perspective view showing a complete power operated weighing system constructed in accordance with the invention and including a power operated scale, apparatus actuated by the scale for computing the value of the weighed load, and a register for printing and issuing printed tickets identifying the weighed commodity with its weight, unit price and value.
Figure 36:
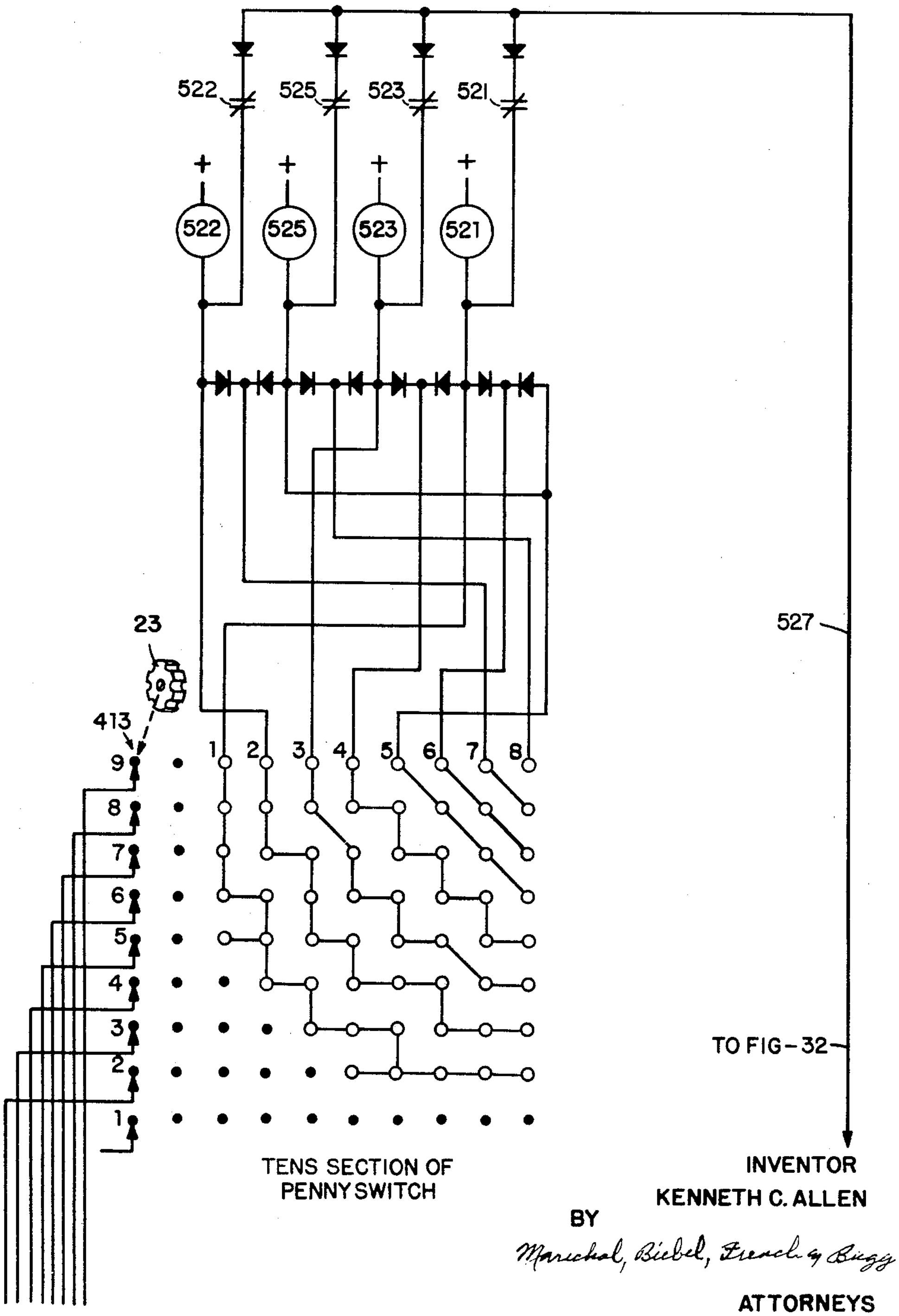
Figure 37:
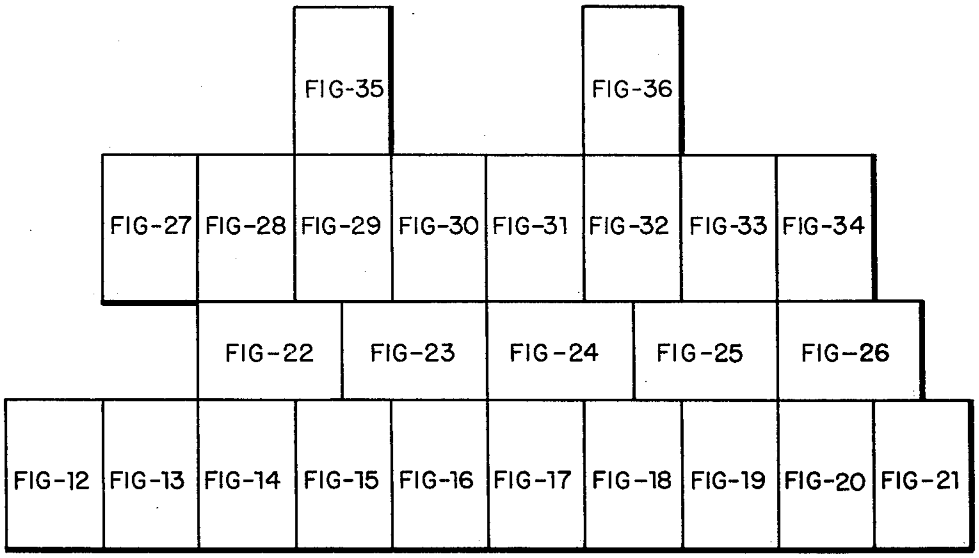
Figure 38:
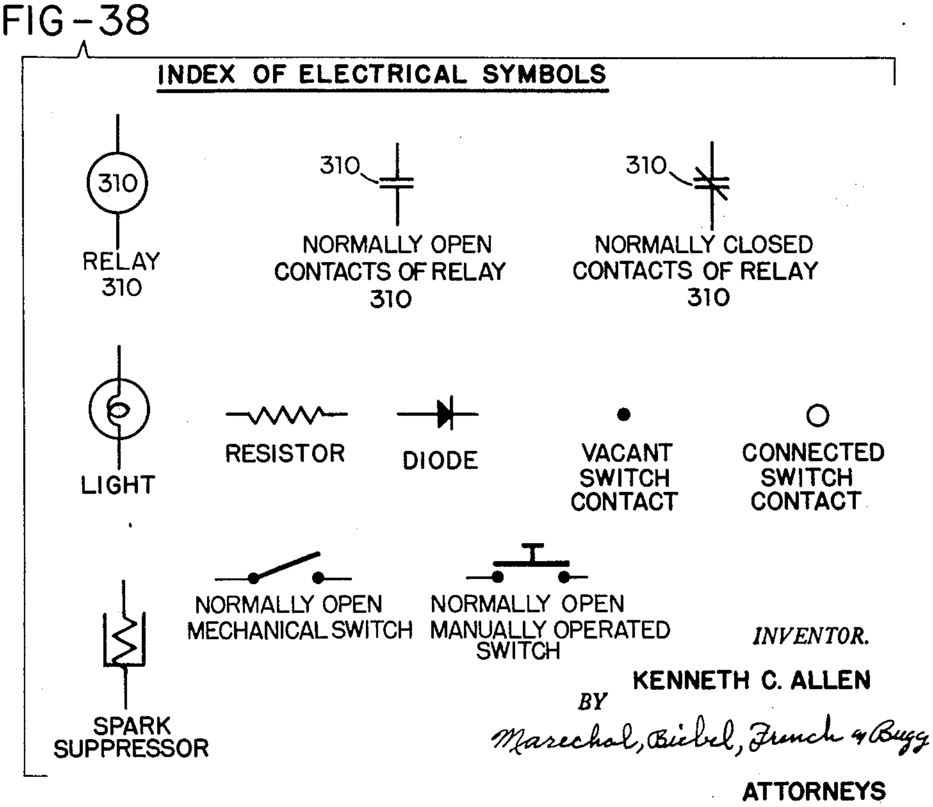

FIGS. 12–36 constitute portions of a wiring diagram for the weighing system of FIG. 1 which form the complete weighing diagram when arranged in accordance with the pattern shown in FIG. 37; and FIG. 38 illustrates the electrical symbols employed in the wiring diagram of FIGS. 12–36.

Referring to the drawings, which illustrate preferred embodiments of the invention, the complete weighing system of FIG. 1 includes a power operated scale indicated generally at 10 and including a platter 11 which receives the package or other article to be weighed. The scale 10 is described in detail hereinafter, and copending Case A also discloses a power operated mechanism suitable for use in the scale of the invention. The weighing operation of the weighing mechanism of scale 10 is transmitted to a computing apparatus represented generally in FIG. 1 by the housing 12 which registers the total weight in terms of pounds and suitable fractions of a pound, and which also computes the value of the load in accordance with a pre-set price per pound as described in greater detail hereinafter, and an example of a suitable such computer is also disclosed in detail in copending Case B.

The scale 10 and computer 12 are in turn interconnected with a register-printer indicated generally at 13 which is constructed for cooperation with the scale and computer to print and issue successive printed tickets showing the weight and the unit price and value of each load weighed by the scale. A suitable such register-printer is disclosed in detail in copending Case C. An example of a ticket produced by the printer 13 is shown at 15 in FIG. 2, and the register-printer also is provided with visual indicator wheels 20 showing the weight and computed value of each load.

The register-printer 13 is provided with manual control knobs 21, 22 and 23 which corresponds to dollars, dimes and cents per pound and are mounted on the outside of the printer casing for pre-setting the unit price of the commodity being weighed, all as described in Case C. In addition, the register-printer is shown as incorporating a mechanism indicated generally at 25 which functions to receive each successive ticket issued by the printer and to deliver such ticket to the operator in a manner offering maximum aid in achieving speed and accuracy in the application of such tickets to the successive weighed packages. Such ticket handling mechanism or labeler is disclosed in detail in copending Case D.

Figures 3, 4, 5, 6:
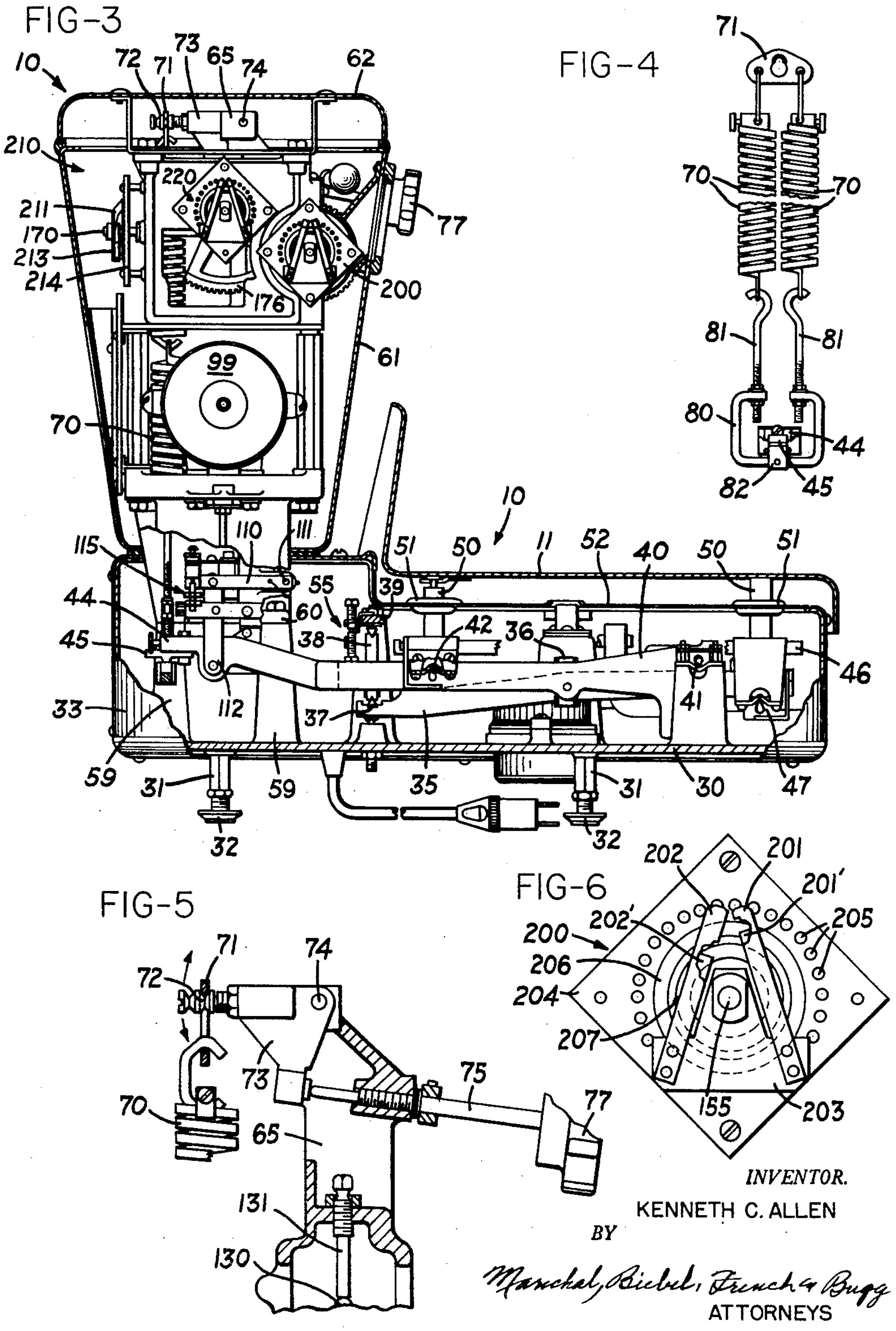
FIG. 3 is a view of the scale of FIG. 1 looking from left to right in FIG. 1 and with the casing and some of the parts broken away in vertical section.
FIG. 4 is a fragmentary view looking from left to right in FIG. 3 to show the balancing springs and their mounting means.
FIG. 5 is an enlarged fragment of FIG. 3 showing the tare adjustment and additional details of the spring mounting.
FIG. 6 is an enlarged and partially broken fragment of FIG. 3 showing the face of one of the read-out switches.
Figure 7:
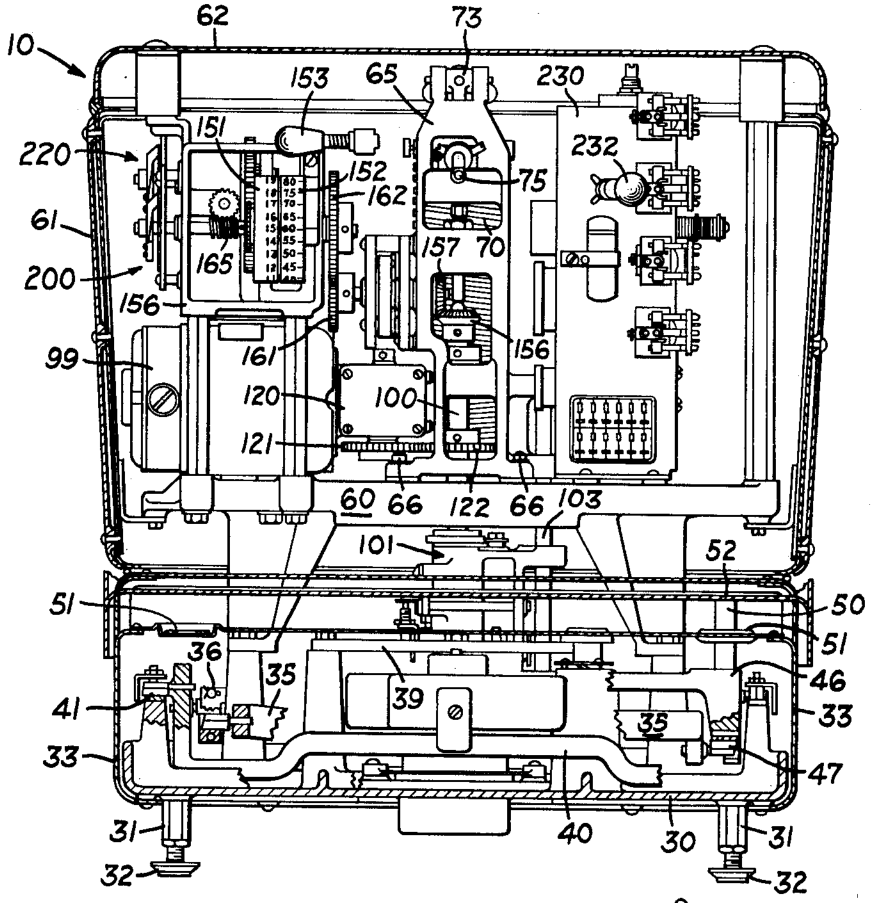
FIG. 7 is a view of the front of the scale of FIG. 1 with the casing and some other parts broken away in generally vertical section.

The structure of the scale 10 is illustrated in detail in FIGS. 3–11. Referring particularly to FIGS. 3 and 7, the scale includes a base 30 made of a ribbed casing which includes leg portions 31 within which the adjustable feet 32 are received to provide for leveling the base upon its support. This base and the weighing mechanism in the main portion thereof are enclosed by a housing 33 and are shown as of substantially the construction disclosed in Meeker et al. Patent No. 2,649,293 issued August 8, 1953 to the assignee of this application.

The weighing mechanism is shown somewhat fragmentarily as of the double lever type, with the two levers being interfitted with each other. The inner lever 35 is pivoted on floating links 36 carried at intermediate points on the outer lever 40, and its rearward end is fulcrumed by engagement of a pivot 37 thereon with a bearing recess in the lower end of a strut 38 having a similar bearing recess at its upper end which receives a downwardly projecting portion of a strut support bar 39 secured at its opposite ends upon portions of the base casting 30. The outer lever 40 is pivoted on fulcrum bearings 41 which are fixed to the base 30 as shown, and it includes rearwardly extending arm portions on which are secured pivots 42 which form supports for the rearward end of the platter. At its rearward end, the outer lever 40 includes a rearwardly extending arm portion 44 which carries the nose iron 45 at its outer end.

A generally rectangular frame 46 for receiving the platter 11 is supported on the pivots 42 and on similar pivots 47 carried by the forward portion of the inner lever 35. The platter is directly supported by posts 50 which extend upwardly from the corners of the frame 46 through seals 51 in a housing plate 52 which cooperates with the casing 33 to seal the interior of the weighing mechanism. FIG. 3 also shows the switch 55 carried by the strut bar 39 and the inner lever 40 which controls the No Load relay as described in Case A and is closed only when there is less than a predetermined minimum load on the platter such, for example, as one-quarter pound.

The base 30 includes boss portions 59 at the back thereof on which is rigidly secured a sub-base 60 which supports the counterbalancing system, the weight indicating mechanism, and its associated drive, all of which are enclosed by a lower panel assembly 61 and a top cover 62. The main supporting member within this upper housing is the spring support column 65, which is rigidly secured to the sub-base 60 by means of the bolts 66. At the upper end of the column 65 is an adjustable support assembly for the pair of counterbalancing springs 70, which includes a hanger 71 pivoted at 72 on an arm 73 which is in turn pivoted at 74 in the upper end of the column 65. The tare adjusting shaft 75 is threaded as shown in FIG. 5 through the front of column 65 for adjustable engagement with the lower end of the arm 73, and the shaft 75 extends outwardly through the lower housing 61 and carries the knob 77 by which this tare adjustment may be effected and controlled.

A generally U-shaped bracket 80 is connected with the lower ends of the springs 70 by hooks 81. The bracket 80 extends around the rearward end of the lever 40, and it includes a suitable bearing 82 engaging the nose iron 45 for transmitting the weighing movements of the lever to the springs 70. Power operated means are provided for sensing the position of the lever 40 during such weighing movements and for transmitting the proper information with respect to the balanced position of the lever to the computer and the register-printer, and these means are in some respects similar to the apparatus disclosed in Cases A and E.

Figures 10, 11:
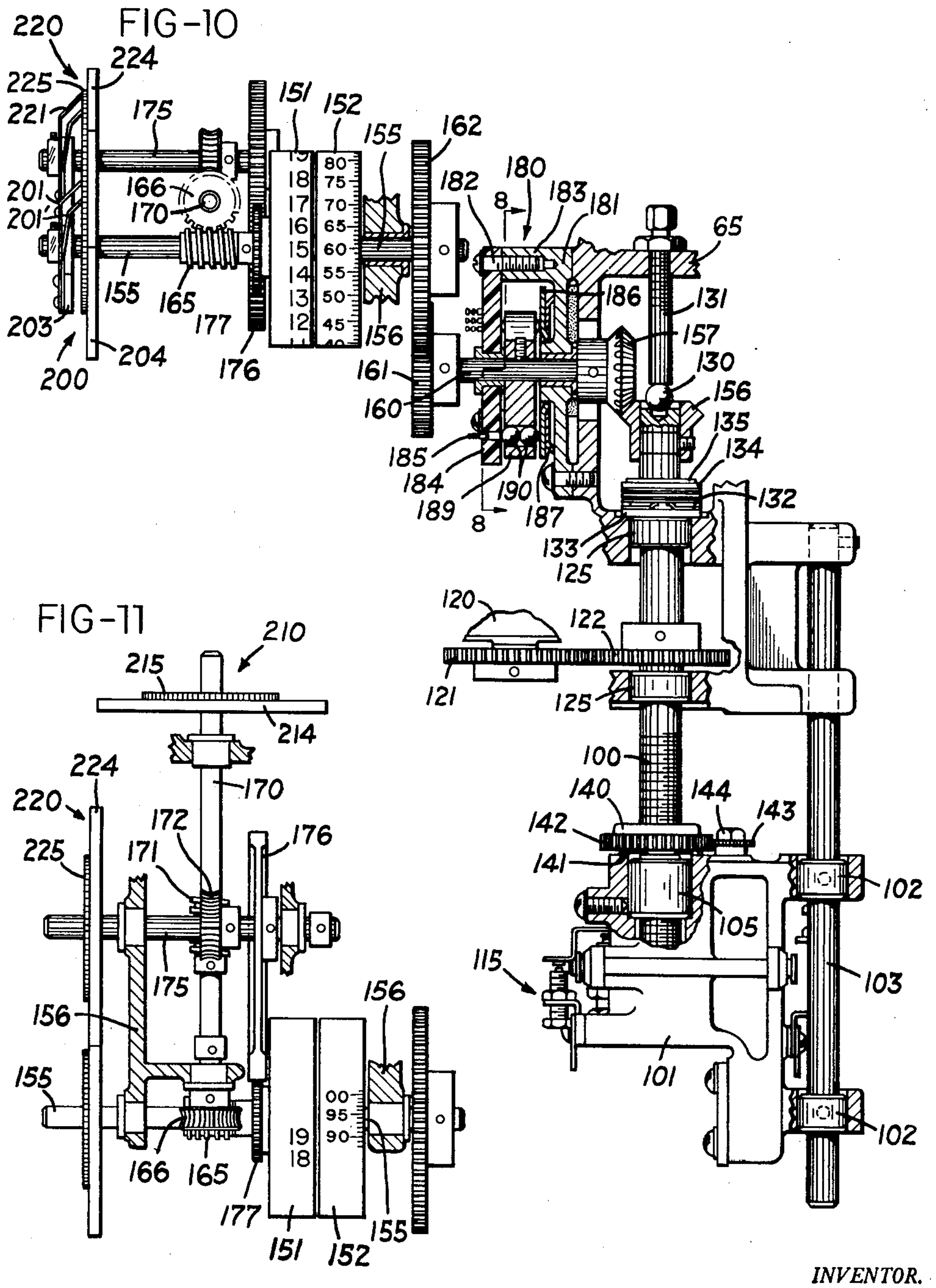
FIG. 10 is a fragmentary view looking in the same direction as FIG. 7 and showing details of the power operated weighing mechanism and also certain of the read-out switches.
FIG. 11 is a fragmentary view looking downwardly on FIG. 10 to illustrate further details of the drive to the several read-out switches.

The sensing mechanism operates in conjunction with a reversible electric motor 99 mounted on the sub-base 60 and connected as described hereinafter to drive a lead screw 100 depending from the column 65. A carriage 101 is mounted by bearings 102 for accurately guided vertical movement on a rod 103 which also depends from the column 65, and a nut 105 is mounted within the carriage 101 as shown in FIG. 10 and provides a threaded driving connection with the lead screw 100 causing vertical movement of the carriage in response to rotation of the lead screw. The carriage 101 carries sensing means for causing and controlling the driving action of the motor 99 in response to weighing movements of the lever 40 and to the extent necessary to maintain the carriage 101 in predetermined relation with the lever 40.

Referring particularly to FIG. 3, a U-shaped arm 110 is pivotally mounted on carriage 101 at 111 and is connected by a link 112 with the end portion 44 of lever 40. This arm 110 corresponds to the part 85 in Case E and functions to operate a sensing switch mechanism indicated generally at 115 which as described in Case E controls the forward and reverse energizing circuits for the motor 99 indicated diagrammatically in FIG. 12. More specifically, whenever the lever 40 moves downwardly under the weight of a load on the platter 10, the motor 99 is energized to drive lead screw 100 in the direction to lower carriage 101 until the neutral position of arm 110 or the carriage is re-established, and vice versa when the lever 40 moves upwardly after the load is removed from the platter. As shown diagrammatically in FIG. 12, the mechanism 115 includes a switch arm 116 having a ground contact 117 which closes both of relays C and R when the scale is in balance, moves down to drop out both of these relays when the scale is moving away from zero under load, and moves upwardly to open only relay C when the scale is moving toward zero.

Special provision is made for protecting lead screw 100 against adverse effects of operating conditions such as heat and backlash and for maintaining it in accurately parallel relation with the slide rod 103 on which the carriage 101 is mounted. As shown in FIG. 7, the motor 99 is mounted at one side of the sub-base 60 in spaced relation with the centrally mounted lead screw 100, and the driving connection from the motor to the lead screw includes a gear reduction 120 driving a spur gear 121 in mesh with a spur gear 122 secured directly on the lead screw. Thus the gear reduction and gears 121 and 122 provide insulation against the transfer of heat from the motor to the lead screw even during prolonged use of the scale.

As best seen in FIG. 10, the lead screw 100 is mounted in spaced web portions of the column 65 by means of radial bearings 125 to provide support against sidewise thrust on the lead screw. It is also important for maintained high accuracy of operation that maximum assurance be provided against the possibility of shifts in the relative axial positions of the lead screw and the fixed upper ends of the springs 70. Thus if the lead screw and springs are supported by different structural members, or even at widely spaced locations in the same member, deflections occurring in the supporting structure, as from thermal expansion or mechanical stresses, are likely to produce relative axial displacement of the lead screw and springs, and such displacement by even such small amount as a few ten-thousandths of an inch may seriously affect the accuracy of the scale.

The present invention provides a construction establishing maintained relative positions of the lead screw and springs irrespective of deflections which may occur in the supporting structure under service conditions. Referring to FIG. 10, a firm reference point for the upper end of the lead screw 100 in the column 65 is established by a ball 130 carried in a recess in the upper end of the lead screw and engaging an adjustable stud 131 threaded in an upper portion of column 65. The ball 130 is maintained in thrust engagement with the lead screw and with stud 131 by a spring loading washer 132 positioned between a shoulder on the column 65 and a thrust washer 133 which in turn is held in fixed position on the lead screw by a collar 134 and retaining ring 135. This construction, as best shown in FIG. 5, establishes the reference point for the lead screw in the same structural part as the support for the upper ends of springs 70 and very close to the springs. Furthermore, not only is this structure at a location such that the chances for deflections to develop are very slight, but any such deflections would affect the lead screw and springs effectively equally and would therefore not affect the overall accuracy of the scale.

Special provision is made by the invention for minimizing backlash between the lead screw 100 and carriage 101, and the mechanism for this purpose is also best seen in FIG. 10. It includes an adjusting nut 140 threaded on the lead screw in compressing relation with a spring loading washer 141 against the upper surface of the carriage 101. The nut 140 is formed or otherwise provided with external gear teeth 142 meshing with a gear 143 mounted on the top of the carriage 101 by a bolt 144, and after nut 140 has been threaded into the desired tightened relation on the lead screw with respect to the carriage and washer 141, it is locked in that position through gear 143 by tightening the bolt 144. The provision of the gears 142 and 143 makes it possible to lock nut 140 axially with respect to nut 105 without affecting the action of the spring washer 141, and when the washer 141 is thus established in spring loading relation with both nut 140 and the drive nut 105 within the carriage, backlash between nut 105 and the threads on the lead screw is effectively prevented.

Means are provided for reading out the angular position of the lead screw 100 during each weighing operation of the scale, and particularly for translating and digitalizing this information for use in the computer and register-printer to produce a record of the weight and value of each weighed load. A direct visual indication of the weight is produced at 150 on the front of the scale by means of a pair of dials 151 and 152 representing pounds and hundredths of pounds respectively, and constantly illuminated during use of the scale by a light 153. The dial 152 is secured on a shaft 155 which is supported in a frame 156 mounted on the sub-base 60. The shaft 155 is driven directly from the lead screw 100 by a pair of miter gears 156 and 157 of 1:1 ratio, a shaft 160 and a pair of spur gears 161 and 162 of selected ratio such that the shaft 155 makes a single complete revolution for each angular movement of the lead screw equal to one pound.

The dial 151 is free on shaft 155 and is driven at a substantially slower rate than the dial 152 depending upon the total range in pounds of the scale. This range is shown as having its maximum at 24.99 pounds, and the dial 151 may therefore be driven at a ratio of 1:25 with respect to dial 152. This drive includes a worm 165 on shaft 155 which drives a worm gear 166 on a shaft 170 at a reduction of 10 to 1, and a worm 171 on shaft 170 drives a worm gear 172 on a shaft 175 also at a reduction of 10 to 1. Since therefore the shaft 175 will normally rotate only through a range of about 90°, a segment 176 on shaft 175 drives a gear 177 secured to the dial 151 at an increase of 1 to 4 to provide the desired 1:25 ratio of dial 151 to dial 152.

Figures 8, 9:
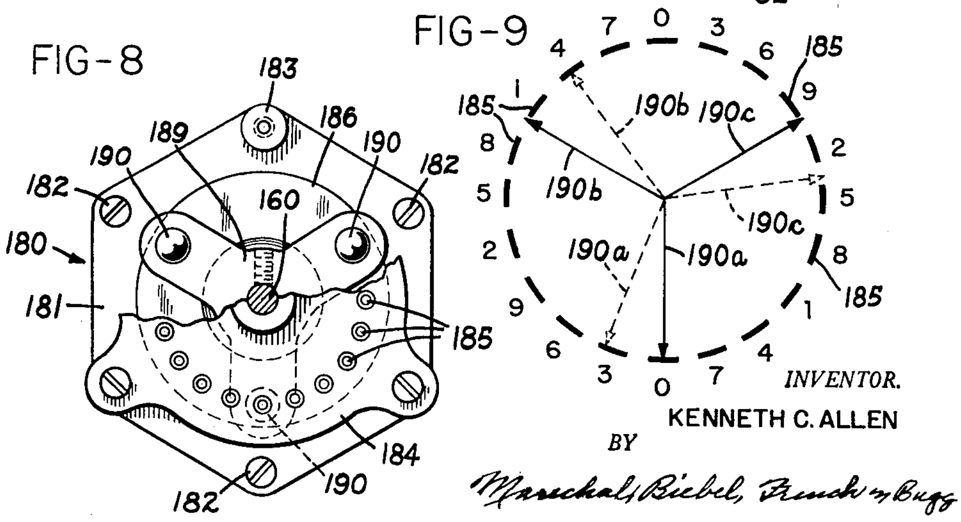
FIG. 8 is an enlarged fragmentary view taken generally on the line 8—8 of FIG. 10 with portions broken away and illustrating the read-out switch for hundredths of pounds.
FIG. 9 is a diagrammatic view illustrating the operation of the switch of FIG. 8.

The shaft 160 also drives a novel electric switch indicated generally at 180 for reading out the angular position of the lead screw 100 and transmitting such information to the computer and printer. Referring particularly to FIGS. 8–10, the shaft 160 is journaled in a frame and bearing assembly 181 mounted on the column 65 by screws 182. The assembly 181 includes three axially projecting bosses 183 on which is mounted a switch contact plate 184 having a plurality of contacts 185 circularly arranged thereon. Opposite the contact plate 184 on the inside of assembly 181 is a metal plate 186 and spring loading washer 187 in grounded engagement with assembly 181, and the rotary member of this switch is a ball retainer 189 secured on shaft 160 and carrying three pairs of steel balls 190 arranged for engagement between the contacts 185 and the grounded plate 186.

The purpose of the switch 180 is to provide for reading out the angular position of the lead screw 100 in small increments, in order to read out the weight in hundredths of a pound. The arrangement of three pairs of balls in the retainer 189 provides structural advantages of maximum stability in the switch, and the contact plate 184 is shown as having a total of 20 contacts 185, which provide for practical spacing in a switch of convenient size for a multiple of 10 contacts which is not divisible by 3 and is therefore suitable with a decimal system. In other words, this arrangement provides a total of 60 impulses for each revolution of shaft 160 and requires only 1⅔ revolutions of the lead screw 100 and the shaft 160 for each pound, and the gears 161 and 162 should therefore provide a reduction of 5 to 3 between shaft 160 and shaft 155. If it is desired to measure weight in other than a decimal system, as for example in pounds and ounces, the arrangement of contacts and the gearing may readily be modified accordingly.

FIG. 9 illustrates diagrammatically the wiring and operation of switch 180. The three arrows **190*a*–190*c* represent three pairs of balls 190, and the arrow 190*a* is shown in centered engagement with a contact 185 marked "0." The arrow 190*b* is just short of a "1" contact 185, and the arrow 190*c* is approached but at a greater distance from a "2" contact. In this position of the switch 180**, the figure "0" will be transmitted to the computer and printer for the hundredths colum of weight.

FIG. 9 illustrates in dotted lines another position of the ball carrier 189 in which the arrow 190*a* has moved almost out of engagement with a "3" contact. In this position of the switch, the arrow 190*b* is also engaged with a "4" contact, while the arrow 190*c* is approaching but not yet in engagement with a "5" contact. This position of the switch would cause the digit "4" to appear in the hundredths column of the computer and printer, and so forth, it being understood that each pair of like numbered contacts is wired together. It is also desirable that the relative size and spacing of the contacts 185 be such that at all times at least one contact will be in engagement with a ball, and the circuits are such as described hereinafter that when two balls engage different contacts, the higher number of each such bridged contacts will be read out.

Three other read out switches are provided for the tenths of pounds, pounds, and tens of pounds respectively. The tenths of pounds switch is identified generally as 200 and is shown in detail in FIG. 6. It includes a pair of wipers 201 and 202, referred to as leading and trailing wipers respectively, mounted on a rotor 203 which is secured on the shaft 155 and is therefore driven as already described at the same speed as the dial 152 to provide for one revolution thereof for each pound of weight measured by the lead screw 100. The wipers 201 and 202 cooperate with a contact plate 204 having a circular row of contacts 205 thereon, and since this is the tenths of pounds switch, there should be ten operative contacts. This is accomplished with a simple construction in the device as shown through use of the contact plate 204 having 30 contacts 205 thereon which are wired together in pairs and with adjacent such pairs separated by an unconnected contact.

The wipers 201 and 202 are so fixed on the rotor 203 that they can engage adjacent contacts 205, but since every third contact is dead, there is no possibility of the bridging of live contacts by a single wiper nor of the engagement of different pairs of live contacts by the same wiper. This makes practical the use of a standard switch plate of convenient size and shape, but obviously printed circuits and other equivalent arrangements of contacts could be used. Furthermore, while both wipers will at intervals engage connected contacts, which in effect are a single contact, the circuits are arranged as described hereinafter so that this occurs when the digit in the preceding column is in the range of 4–6 so that no difficulty results as to which wiper should control.

In order to provide separate circuits for each of the wipers 201 and 202, the contact plate 204 also carries a pair of concentric slip rings 206 and 207 inside the row of contacts 205 which are connected selectively to ground as described hereinafter in connection with the wiring diagram. The wiper 201 includes a supplemental wiper arm 201′ which is continually in engagement with the slip ring 206, and the wiper 202 includes a similar supplemental arm 202′ in continuous engagement with the ring 207. The electric operation of this switch is described in detail hereinafter in connection with the wiring diagram.

The switch 210 for the reading out pounds is shown as identical with the switch 200 and includes wipers 211 and 212 on a rotor 213 secured to the shaft 170 and cooperating with a contact plate 214 provided with multiple contacts 215 arranged and connected in pairs in the same manner as the contacts 205, and the rotor 213 therefore rotates at a ratio of 1:10 with respect to the rotor 203. The switch 220 for tens of pounds is also shown as of identical construction incorporating wipers 221 and 222 on a rotor 223 which is secured on shaft 175 and therefore rotates at a ratio of 1:10 with respect to the shaft 170 through a limited range of approximately 90° as previously noted. This means that the contact plate 224 requires only enough contacts 225 for values of "0," "1" and "2" in the tens column of weight, but for convenience of production, the contact plate 224 may be identical with the plates 203 and 213 as shown except that only the necessary limited number of pairs of its contacts are connected in the wiring system, and the "9" contact is also used for the purpose of indicating when the scale is below zero.

At the opposite side of the sub-base 60 from the frame 156 is a mount 230 which supports the several relays controlling operation of the scale. The mount 230 also supports a signal light 232 which is energized in coordinated relation with the operation of the scale and computer to signal to the operator the progress of the weighing operation, and which is visible through the window 235 in the front of the scale housing. This light is out while the scale is weighing, but as soon as the weighing is completed and the computer has started its operations, the light 232 comes on to indicate that the load can now be removed from the platter and replaced by a new load.

Figure 12:
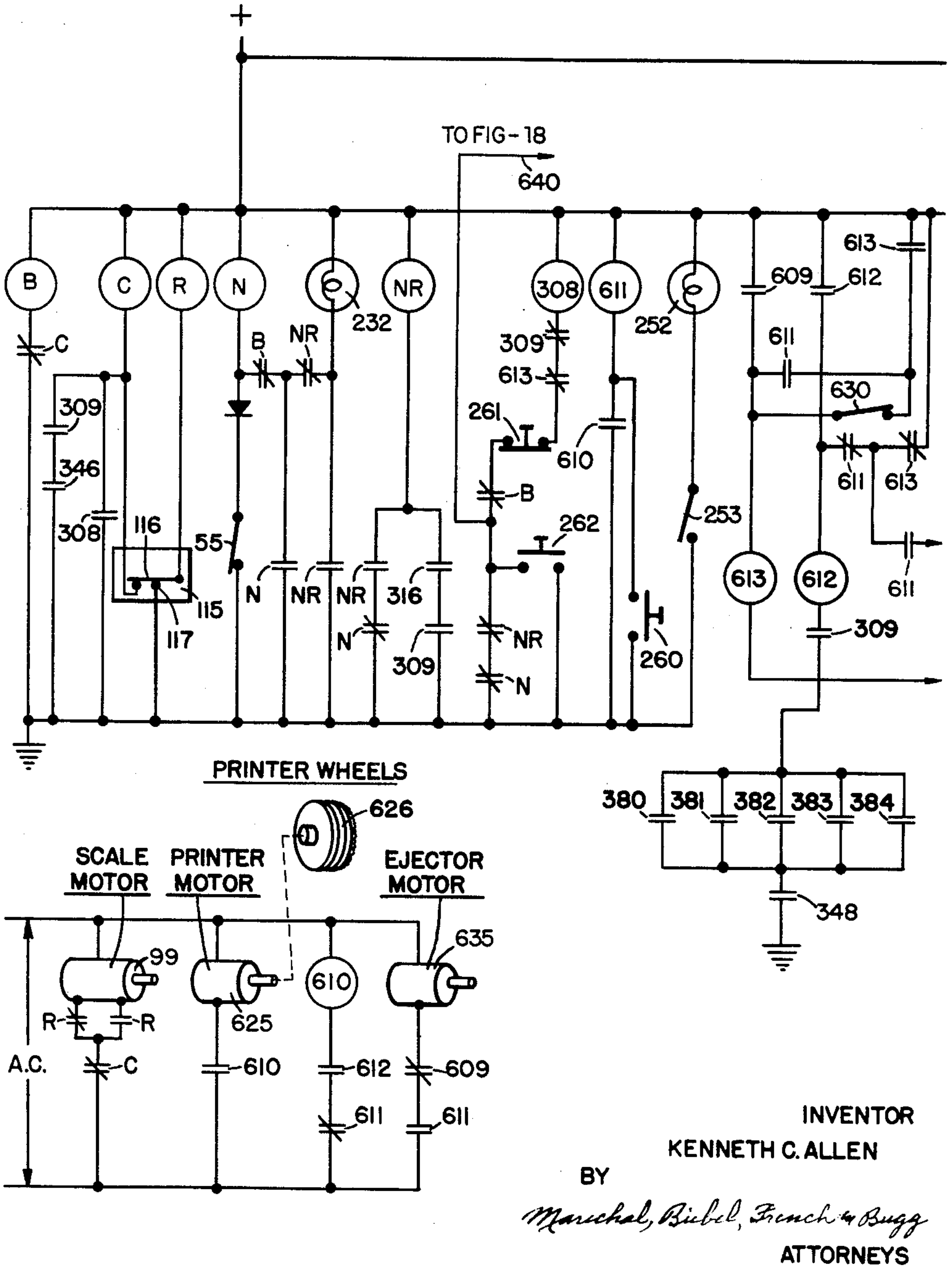

There are additional signal lights and also several manual switches on the register-printer which will now be identified, although they are all also described in Case C. The light 250 is the Error light corresponding to light 585 in Case C which is energized in the event of improper operation of the computer or printer, too great a weight on the platter for the capacity of the scale, a below zero position of the platter. The light 251 is the Change Price light which is energized if the price selecting knobs 21–23 are inaccurately set or are not changed following changing in the weighing of one commodity to another as described in connection with the corresponding light 590 in Case C. The light 252 is a warning light signaling approaching exhaustion of the supply of paper on which the successive tickets are printed; it corresponds to light 395 in Case C and is energized by a mechanical switch 253 (FIG. 12).

Figure 13:
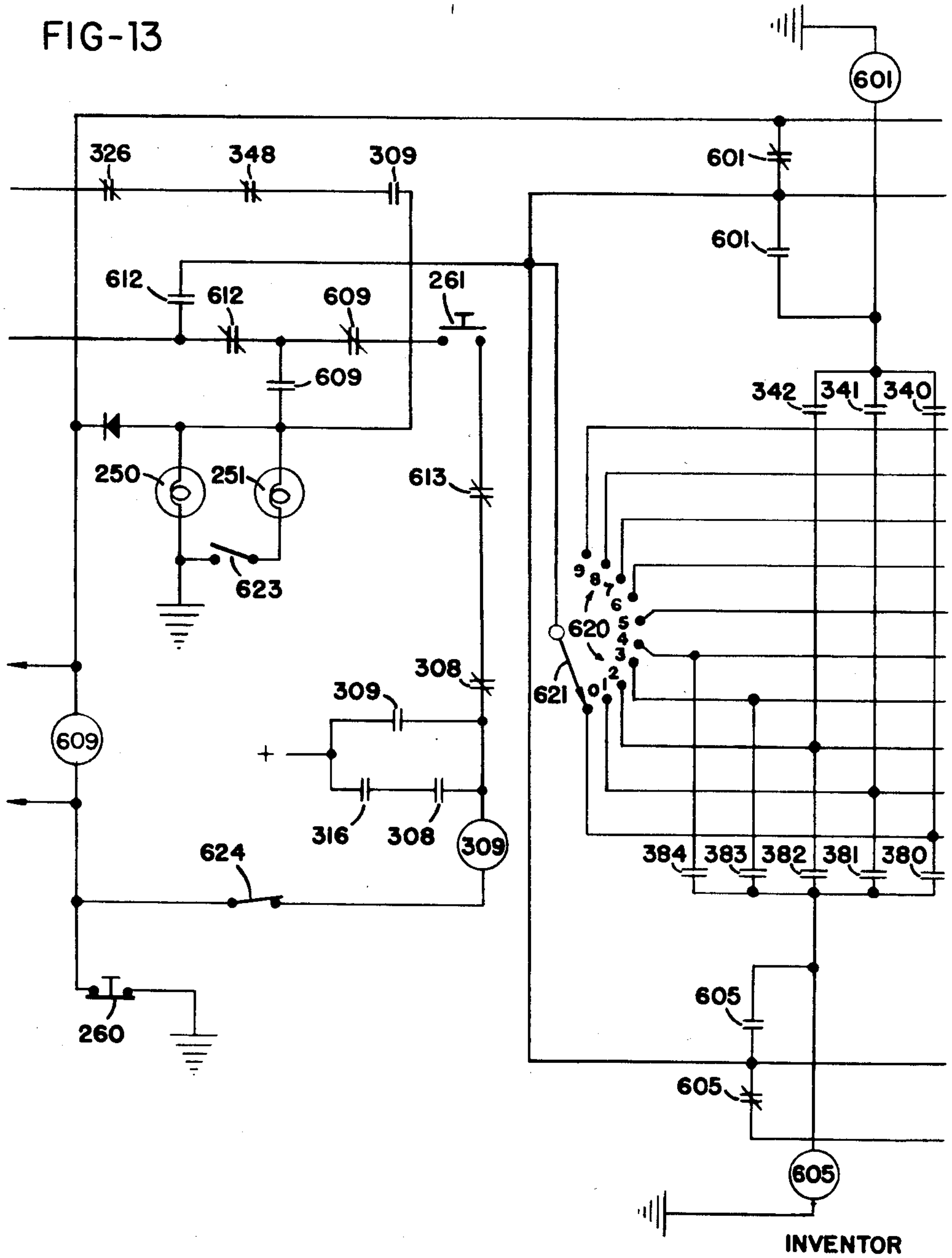
Figure 14:
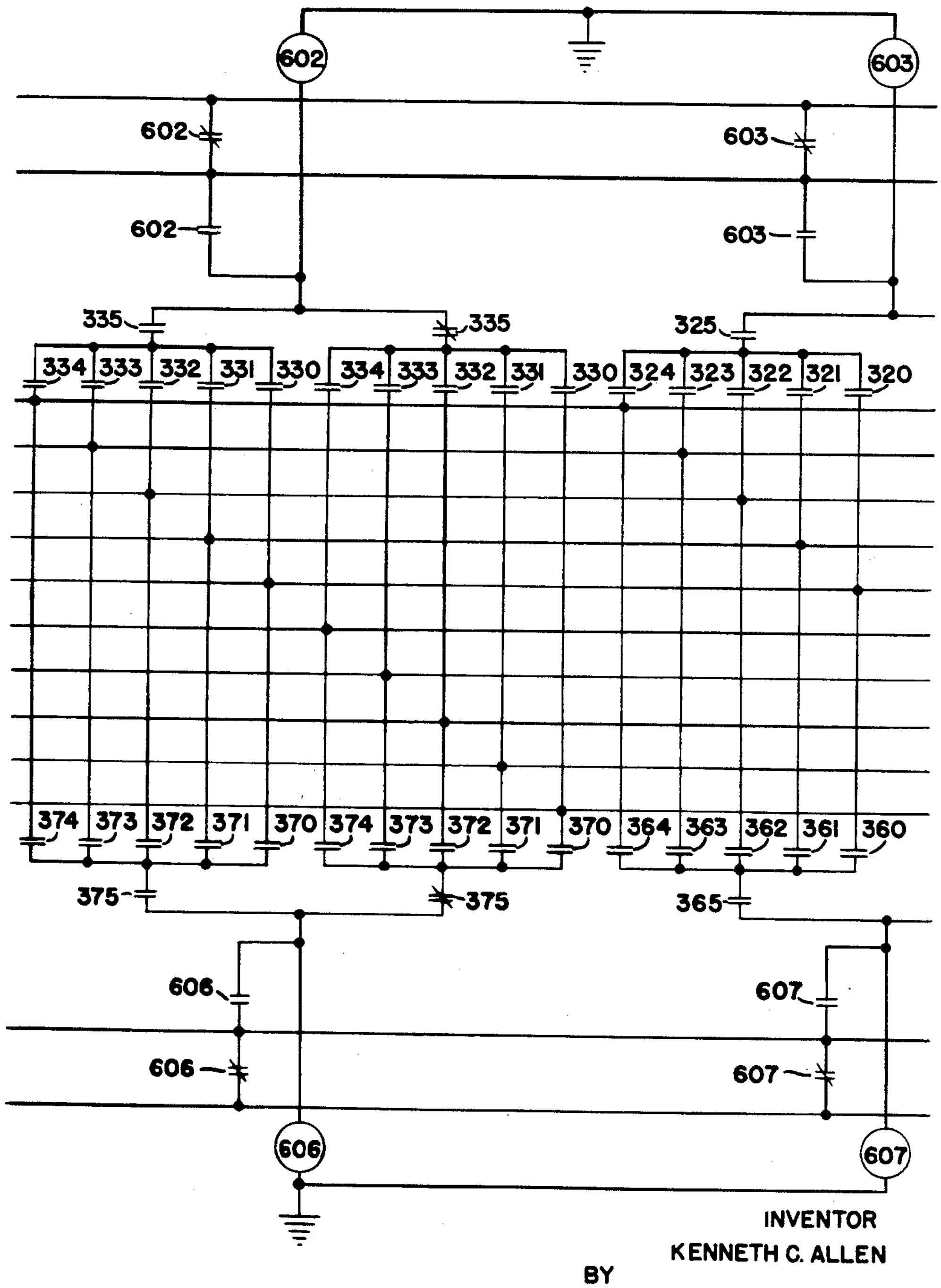
Figure 15:
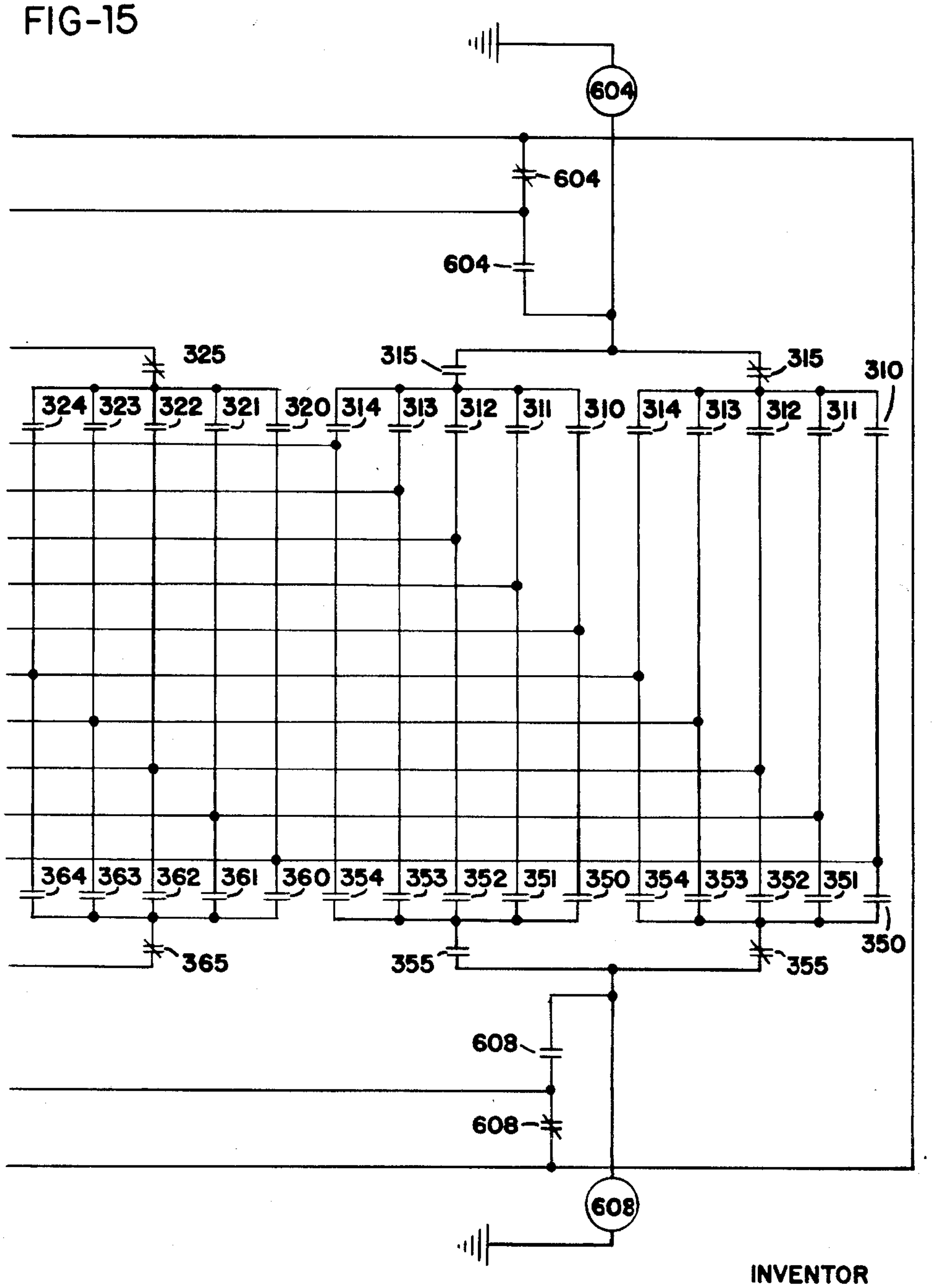
Figure 18:
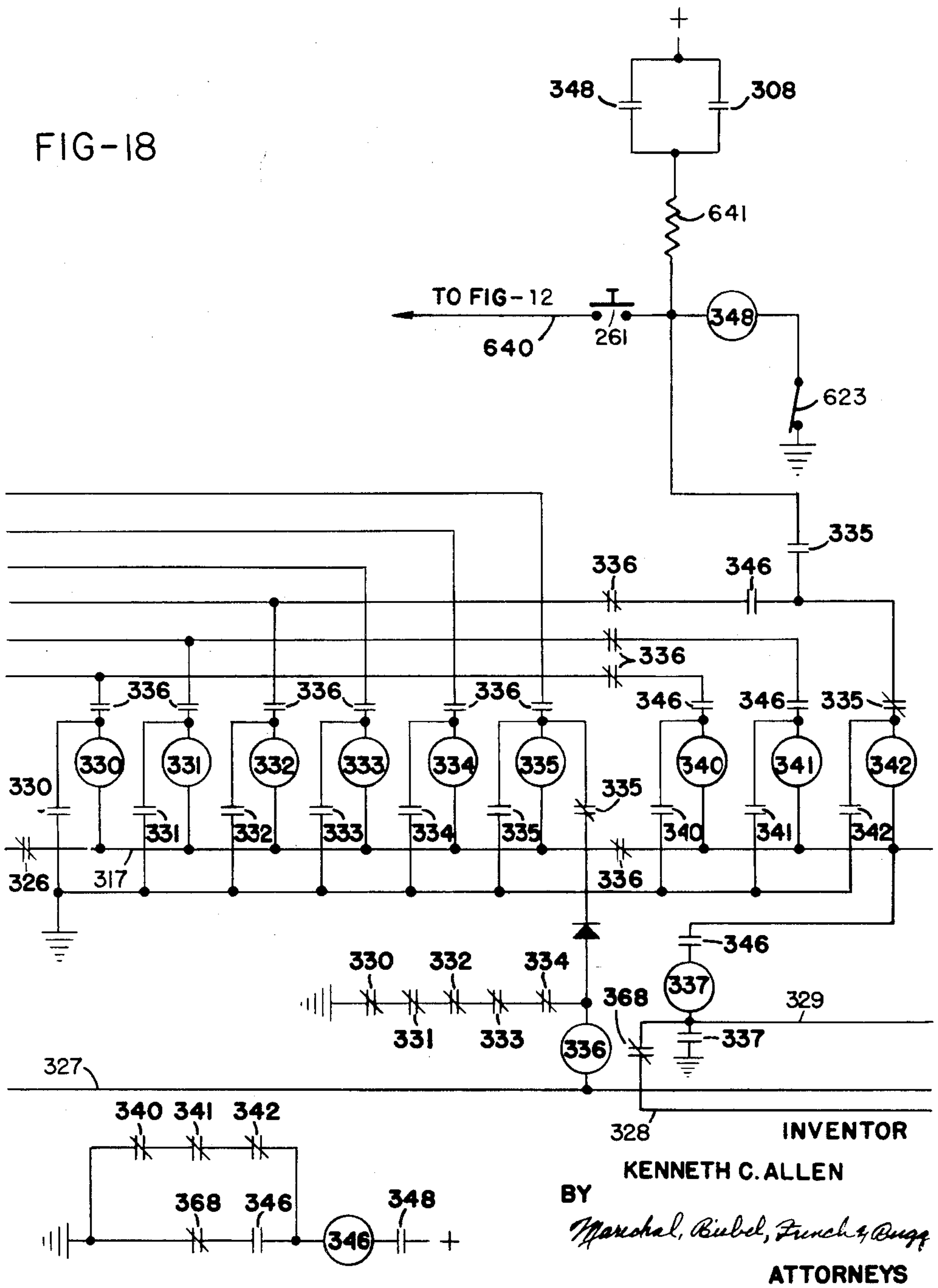

Again referring to FIG. 1, the manual switch 260 is the reset switch effective to correct for errors occurring in the operation of the scale as described in connection with switch 600 in Case C. The manual switch 261 is the Repeat switch causing the printer to issue a plurality of identical labels for packages of a fixed weight, and it is a double pole double throw switch as shown in FIGS. 12, 13 and 18. The manual switch 262 corresponds to switch 620 in Case C and is the starting switch used primarily to initiate manual operation of the complete printing cycle for test purposes or when the load is too light to actuate the No Load switch 55.

*Sequence of Operation*

The sequence of operation of the entire system of the invention will now be described in connection with the wiring diagram which is made up of multiple views constituting FIGS. 12 to 36 arranged in the pattern shown in FIG. 37. For convenience of understanding, FIG. 38 explains the various symbols used in the wiring diagram, and additionally the reference characters used therein, other than those already noted in connection with FIGS. 1–11, are arranged in different series depending upon the location or function of the particular parts. Thus numbers from 300 to 399 identify parts in the storage section of the computer, numbers in the 400's and 500's identify parts in the multiplication and addition sections of the computer respectively, and numbers from 600 upward identify parts in the printer and labeler.

Figure 2:
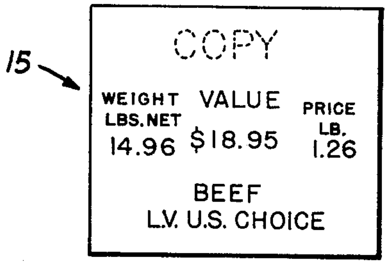
FIG. 2 illustrates a printed ticket of the type issued by the apparatus of FIG. 1.

The following description of a complete cycle of the system of the invention is given with reference to the ticket or label shown in FIG. 2, which shows that the package of beef at a price of $1.26 per pound weighed 14.96 pounds and had a value of $18.85. It is also assumed for the purpose of this explanation that the scale has returned to its No Load position after the price for the preceding package had been computed and printed, so that it starts from a zero position.

The circuits for the scale are shown only fragmentarily in FIG. 12, in view of the complete disclosure of such circuits in Cases A, E and F. In the assumed starting position of the scale, the No Load relay N is energized through the closed platter or No Load switch 55, and is locked in through the back contacts of the balance relay B which is open because control relay C is closed through the switch 116 in the sensing switch mechanism 115. There is therefore a complete energizing circuit for the signal light 232 through the front contacts of relay N and the back contacts of the non-repeat relay NR, the function of relay NR being to prevent repeat operation of the computer for the same load on the scale. The relay R is the reversing relay controlling the direction of operation of motor 99, as indicated diagrammatically in the lower left hand portion of FIG. 12, and at the assumed starting position, it will be operated through switch 116 to set the motor to drive the carriage 101 upwards.

As soon as the package is placed on the platter, switch 55 opens, and the sensing switch mechanism 115 opens the energizing circuits for both of relays C and R, and relay B therefore closes to drop out relay N and to put out light 232. The weighing operation then proceeds as described in the above two applications, and during this interval the several switches 180, 200, 210 and 220 are operated as described to sense the angular position of the lead screw 100. When the scale is in balance, the sensing switch mechanism 115 operates to close control relay C, and this in turn immediately opens the back contacts of relay C in the power circuit of the scale motor 99 and thus causes motor 99 to stop. Similarly the back contacts of relay C in the energizing circuit of relay B open, and relay B therefore opens.

The opening of relay B initiates operation of the computer by completing an energizing circuit for relay 308 to ground through back contacts of relay N, NR and B, repeat switch 261, and relays 613 and 309. Closing of relay 308 breaks the energizing circuit through its back contacts for the set of relays in the 300 series in which the information from the previous weighing and computing operation had been stored and thus prepares the computer to receive and compute the results of the new weighing operation. At the same time, the closing of relay 308 completes an energizing circuit for the relay 348 (FIG. 18), which is the error relay for detecting improper operation of the weight readout and storage section of the computer. The energizing circuit for the relay 348 is completed through a mechanical switch 623 which corresponds to the switch 501 in Case C, and the relay 348 locks itself in and also completes the energizing circuit for a protective relay 346 as shown in FIG. 18. Additionally, closing of relay 308 completes a holding circuit for relay C to continue the locking of scale motor 99 until the weight has been read out as now described.

Figure 16:
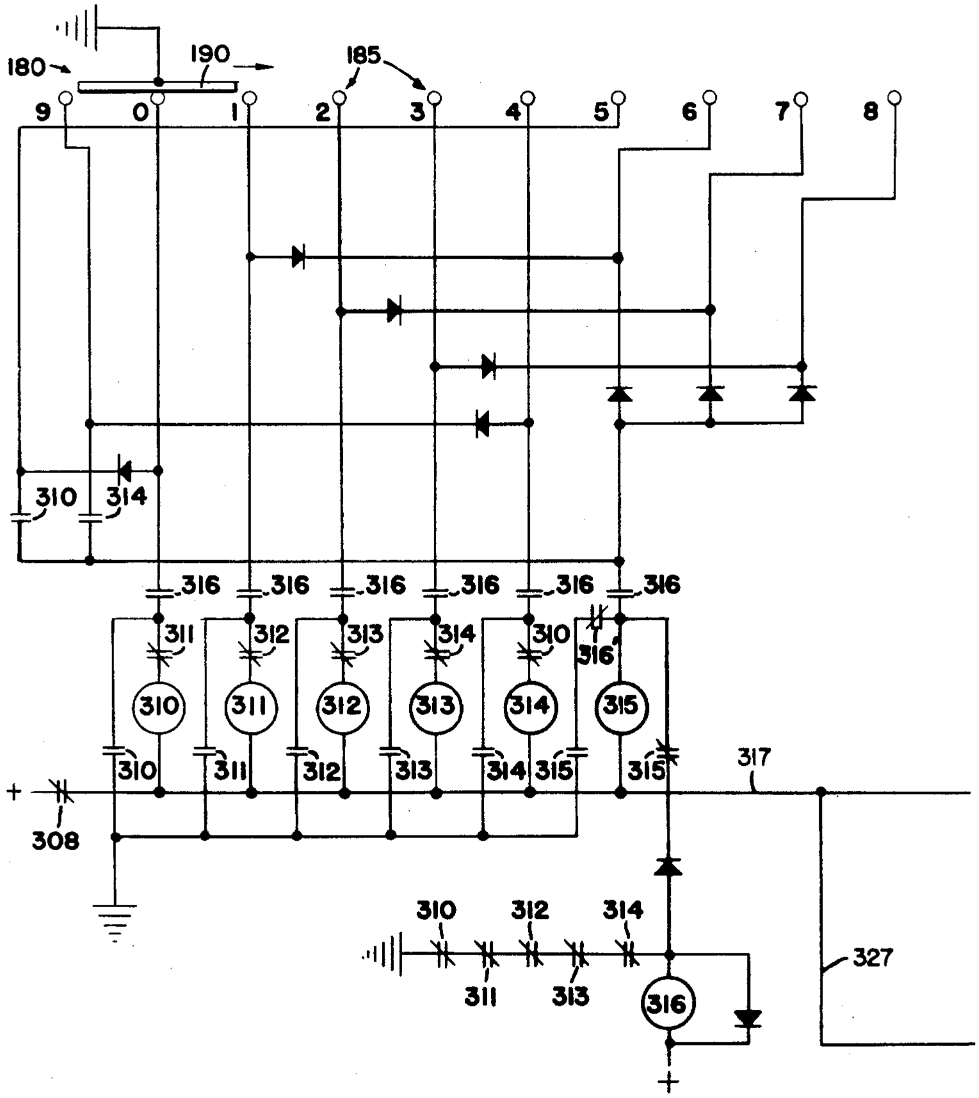

As soon as the relays 310–315 which were energized have been dropped out by the closing of relay 308 and the opening of its back contacts, relay 316 is energized as shown in FIG. 16. This completes an energizing circuit for relay 309 through the back contacts of the reset switch 260 and the back contacts of a cam-operated mechanical switch 624. The relay 309 and switch 624 correspond in function to the relay 520 and switch 535 of Case C, and relay 309 locks itself in as shown in FIG. 13. Closing of relay 309 breaks the energizing circuit through its back contacts for relay 308, and relay 308 opens to re-establish the power supply through its back contacts in FIG. 16 for the storage relays in the 300 series. This power supply is protected against subsequent reclosing of relay 308 by the opening of the back contacts of relay 309, since relay 309 remains closed as described hereinafter until the printing operation has been completed.

Closing of relay 309 completes the energizing circuit for the non-repeat relay NR through front contacts of relays 309 and 316 to prevent repeat operation of the computer when relay 309 drops out unless a new load has been placed on the platter. Closing of relay NR re-establishes an energizing circuit for the signal light 232 to signal to the operator that the load on the platter can now be removed and replaced, but the scale motor is still held locked by relay C since closing of relay 309 completed a holding circuit for relay C through front contacts of relays 309 and 346 which maintains relay C closed after the parallel holding circuit through front contacts of relay 308 is broken by the opening of relay 308 when relay 309 is closed.

Referring now to FIG. 16, which illustrates the electrical connections for the hundredths pound switch, only ten contacts 185 are shown because the other ten such contacts are connected therewith in parallel as already described. The balls 190 are represented diagrammatically by a wiper 190, which in accordance with the example stated above will be assumed to have stopped in engagement with the "6" contact 185. Therefore when relay 316 closes as described, a ground will be applied to the relay 315 and also to the relay 311, and when relay 308 opens, these two relays will close and lock themselves in to store the digit "6" for the hundredths column of weight. Closing of relays 311 will break the main energizing circuit for relay 316, but relay 316 will not open unless relay 315 also has operated, as noted in greater detail hereinafter.

It will now be seen that the successive relays 310–314 represent respectively values 0, 1, 2, 3 and 4 in the hundredths column of weight, and relay 315 represents an Add-5 in this column. In other words, if the wiper 190 has stopped on the "1" contact 185, only relay 311 would have closed, but in the assumed example, the value of "6" was obtained by adding 1 and 5. It will also be seen from FIG. 16 that if the wiper 190 had stopped in bridging relation with both the "5" and "6" contacts 185, relay 310 would also have tended to close, but the simultaneous closing of relay 311 would have reopened relay 310 through the back contacts of relay 311. Similarly if the "4" and "5" contacts are bridged, relay 310 and also relay 314 will tend to operate, but this operation of relay 310 will block relay 314 from operation, and also cause relay 315 to operate as shown. In other words, this circuit arrangement provides that whenever the balls 190 stop in bridging relation with a pair of contacts 185, only the relays corresponding to the higher value contact will operate.

One special case of bridging contacts in switch 180 should also be noted. If the balls 190 stop in bridging relation with the "9" and "0" contacts 185, the correct figure to be read out would be "0," but there would be a tendency for all three relays 310, 314, and 315 to operate. Closing of relay 310 would break the holding circuit for relay 314 as shown, but there is no similar set of contacts in the holding circuit for the relay 315. Therefore this circuit includes a pair of back contacts of relay 316, which prevent locking of relay 315 until relay 314 has been opened and thus removed the ground through its front contacts from the "9" contact 185 to the relay 315, and relay 315 then drops out.

Figure 17:
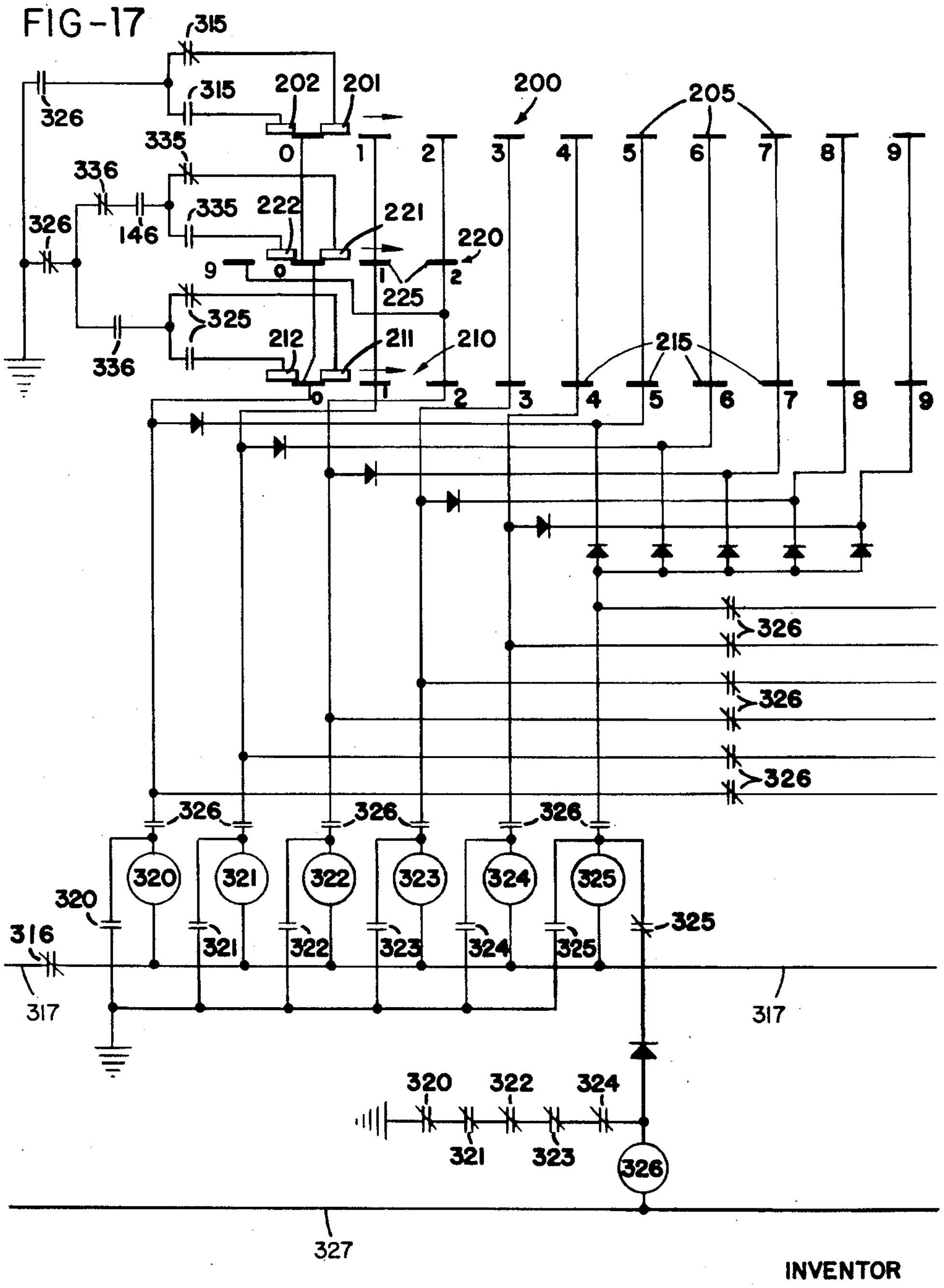

The circuits for the remaining weight read-out switches are shown in FIGS. 17 and 18. At the assumed weight of 14.96 pounds, the tenths of a pound switch 200 will have stopped with both of its leading and trailing its wipers 201 and 202 in engagement with the "9" contact 205. However, since relay 315 has been closed as already described, the back contacts of relay 315 in the circuit to ground from leading wiper 201 will be broken, and the front contacts of relay 315 in the circuit to ground from trailing wiper 202 will have closed. Relay 326 will already have closed through the power line 327 when relay 308 opened, and the same is true of each of relays 336, 356, 366 and 376. Therefore when relay 316 is opened by the closing of relays 311 and 315 as described, power will be made available for the series of relays 320–325, and with the wipers as stated, relays 324 and 325 will close to add their respective values of 4 and 5 to produce and store the desired figure of "9" for the tenths column of weight. Since relay 326 will immediately be reopened by the closing of both of relays 324 and 325, relays 320–323 will be disabled.

It should be noted at this point that if the correct weight to be read out by the switches 180 and 200 had been, for example, 0.94 pound, then the wipers 201 and 202 would both have stopped in engagement with the "9" contact 205. However, since the relay 315 would have remained open because wiper 190 would not have closed its circuit, the leading wiper 201 would have been the effective wiper through the back contacts of relay 315 to produce the "9" reading. If the weight figure had been 0.89 pound, the wipers 201 and 202 would have stopped in engagement respectively with the "9" and "8" contacts 205, but because relay 315 would have been closed, the circuit would be completed through trailing wiper 202 to produce the reading "8." Similarly, for a weight of 0.98 pound, the wipers would have stopped in engagement respectively with "0" and "9" contacts 205, but the closing of relay 315 would have connected the trailing wiper 202 in the circuit to give the proper reading "9."

It is therefore a characteristic of the read out switch 200 that whenever its wipers stop on different contacts, determination of the correct wiper and contact to be selected and connected in the output circuit of the switch is made in response to the value of the reading of the read out switch for the next lower order digit. Thus when such lower order digit for the switch 180 is in the lower part of its range, including from its minimum reading of "0" up to "4," the relay 315 will not be operated, and the leading wiper 201 will therefore be effective. When the lower order digit is in the upper part of its range from "5" up to its maximum of "9," the relay 315 will be operated, and therefore the trailing wiper 202 will be effective.

The same controlling relation exists between the switches 200 and 210 and between the switches 210 and 220, as will appear from the description of the operation in this illustrative example. These switches 200, 210 and 220 also have additional common structural characteristics which promote these operational features. For example, both wipers of each switch are never simultaneously out of engagement with at least one contact, or rather one wiper of each pair is always in engagement with a live contact, but neither wiper is ever simultaneously in bridging engagement with a pair of live contacts. Additionally, the spacing of the contacts and the dimensions of the wipers are such that both wipers can rest on the same live contact or simultaneously rest on different adjacent contacts.

Note also that for each of these read-out switches, the associated relay circuit provide a guarding action which prevents initiation of the next sequence if any relay in the group should have operated but has failed to do so. Thus in the case of switches 180 and 200, for each digit from 0 to 4, only one of the relays 310–314 should operate, and when it does, it breaks the ground circuit through its back contacts for the relay 316 and thereby drops out relay 316, which is the sequencing relay for this group in that when it opens, it makes power available for the next group of relays 320–325. If, on the other hand, the one relay in the group 310–314 which should operate does not do so, relay 316 remains closed to block initiation of the next sequence.

For digits from 5 to 9, both the relay 315 and one of the relays 310–314 must operate, and the invention provides circuits which assure correct operation of both relays in each such pair of relays before the next sequence can begin. Thus in the present example, energizing circuits were established for relays 311 and 315. If relay 311 operates but relay 315 does not, the ground which is being delivered to relay 315 from the balls 190 is simultaneously delivered through the back contacts of relay 315 and the associated diode in FIG. 16 to relay 316 to hold the latter closed until relay 315 has operated and opened these back contacts. Similarly if relay 315 operates but relay 311 does not, relay 316 will remain closed through the back contacts of relay 311 to prevent initiation of the next sequence.

Now proceeding to the pounds switch 210, its wipers 211 and 212 for the assumed weight of 14.96 pounds would have stopped on "5" and "4" contacts 215 respectively. Current would not flow through this switch, however, until the completion of the read-out from switch 200 and the resulting opening of relay 326 to break the ground circuit through its front contacts from the wipers 201 and 202 and to close the ground circuit through its back contacts and the front contacts of relay 336 for the leading and trailing wipers 211 and 212. Additionally, no power is available for the series of relays 330–335 until after relay 326 has been opened by operation of one or more of relays 320–325 to close the series of back contacts of relay 326 in the lines leading to relays 330–335 from the switch contacts 215.

At the assumed weight of 14.96 pounds, the digit in the dimes column will be above the midpoint of its range, and since the relay 325 will have closed as described, the trailing wiper 212 will accordingly be connected to ground. Therefore, when relay 326 opens at the conclusion of the read-out for switch 200, the ground will be applied through wiper 212 to close relay 334, and this relay will lock itself in, and also cause relay 336 to open and thus to disable relays 330–333 and 335. If, however, the weight had been, for example, 15.01 pounds, relay 325 would have remained open, leading wiper 211 would have been connected to ground, and relays 330 and 335 would have closed to store the figure "5" for the pounds column.

The relay 326 has a double guarding action toward the group of relays 330–335 in that its seven pairs of back contacts shown in the lower right hand portion of FIG. 17 control both the power and ground leads to the relays 330–335. Therefore, none of these relays can operate unless and until relay 326 has been dropped out by proper operation of all relays in the 320–325 group which should have operated at the assumed setting of switches 180–200. The same relation exists between the relay 336 and the several relays 340–342 which are associated with the read-out switch 220 for the tens of pounds column.

As just noted, the read-out switch 220 does not become operative until relay 336 has been opened by the closing of relay 334 to make power available to relays 340–342 and to shift the ground connection from wipers 211 and 212 to wipers 221 and 222. At the assumed weight of 14.96 pounds, both of wipers 221 and 222 will have stopped in engagement with the "1" contact 225, and therefore it is immaterial whether relay 335 is open or closed, but since the digit "4" in the pound column is below the midpoint of its range, the relay 335 is open to apply the ground through leading wiper 221 to close relay 341 and thereby to store the digit "1" in the ten pounds column. There are only three relays in the group for the ten pounds column only because the highest possible digit in this column is "2" at the indicated limits of weight and price, but if these limits are increased, additional relays would be added in the same manner as for the preceding groups.

At this juncture the direct weight read-out is completed and stored, and computation of the price is ready to begin. This involves literally the following problem in arithmetic:

```
  14.96
   1.26
 ------
   8976
  2992
 1496
 ------
18.8496
```

However, the computer circuits are constructed to ignore the fourth decimal position, and they add 5 in the third decimal or mill column but ignore the mill total to give the product to the nearest one-half cent. Also, they operate by producing and adding partial products by columns and temporarily storing so that the problem as actually carried out by the computer is as follows:

```
  14.96
   1.26
  -----
    644
   0253
   2882
  0011
  14965
  0221
  -----
  1885
```

The electrical means for this operation are in part identical with the means for the same purpose disclosed in Case B, and include similar rotary selector switches for presetting the price-per-pound, a precomputed multiplication table and adding circuits. The selector switches are represented in the wiring diagram in FIGS. 27 to 36 and are operated by the knobs 21–23 on the outside of the printer housing. Thus the switch controlled by the dollar knob 21 comprises a series of nine wiper arms 401 corresponding to the values from 1 to 9 in each column of weight. These wipers 401 are shown as having only two positions corresponding to 0 and 1, since the price-per-pound for commodities commonly weighed on the scales of the invention do not usually exceed $1.99 although additional positions could of course be added if desired, and it is for this reason that only 9 wipers are required because no tens section is needed in the switch unless there are positions corresponding to a unit price of where the digit in the dollar column is "2" or more.

The selector switches for dimes and pennies each have two sets of wipers and associated contacts, one for a units section and the other for a tens section. Thus the selector switch for dimes includes 10 wipers 402 corresponding to the units column and an additional 10 wipers 412 corresponding to the tens column. These wipers are shown in separate sections on the wiring diagram for convenience of illustration, but in practice they are all carried by a common shaft movable by the knob 22 through the full range of positions from 0 to 9. It will also be understood that all of the similarly numbered contacts for each set of wipers 412 are connected together to the correspondingly numbered contacts in the bottom row. The selector switches for pennies operated by the knob 23 is identical with the dimes switch and similarly includes two sets of wipers 403 and 413 as shown arranged in a units and a tens section. It will be noted that the tens section of the pennies switch is electrically associated with the units section of the dimes switch, and so on, in order to bring together partial products of the same order of value.

Figure 26:
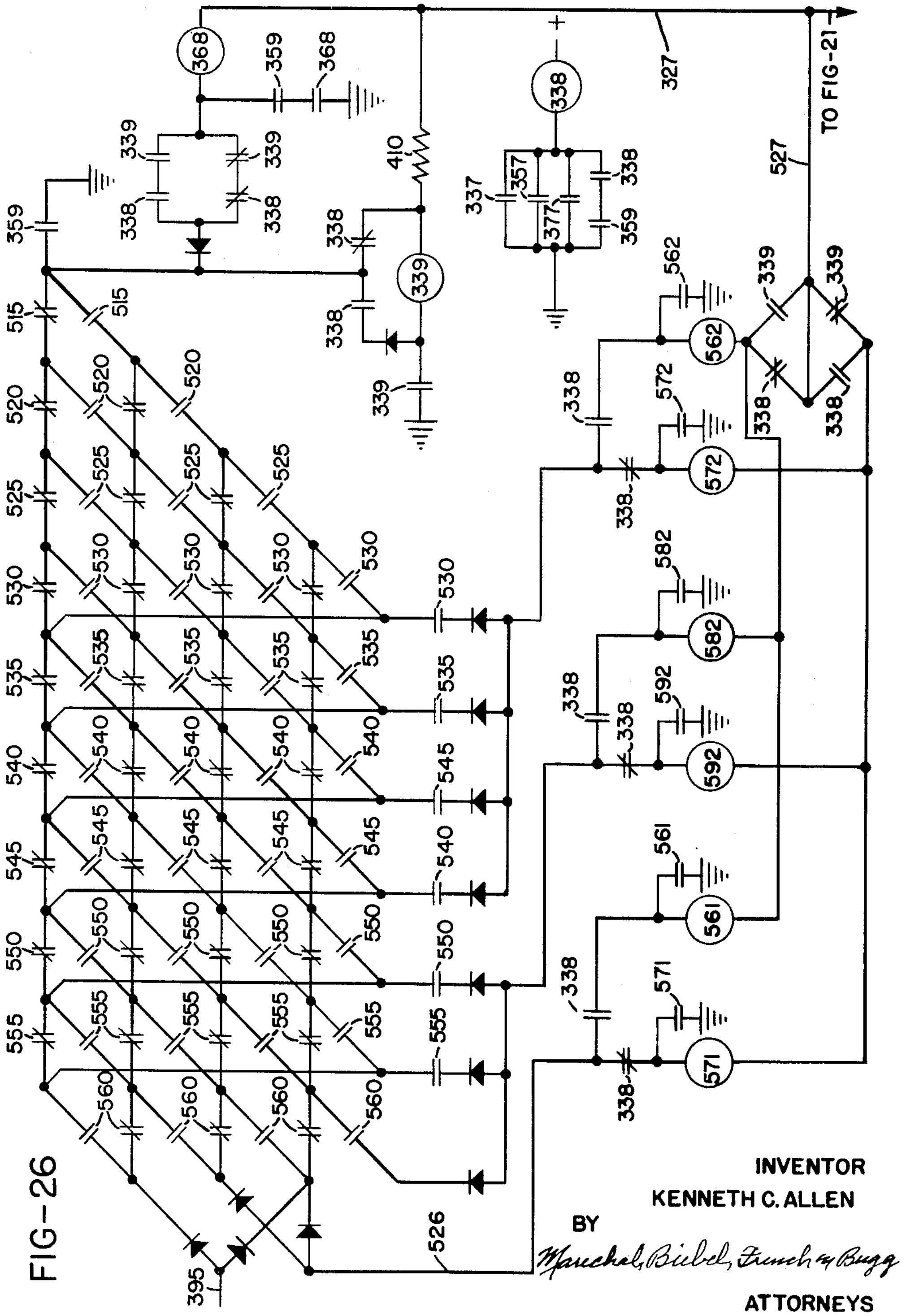
Figure 27:
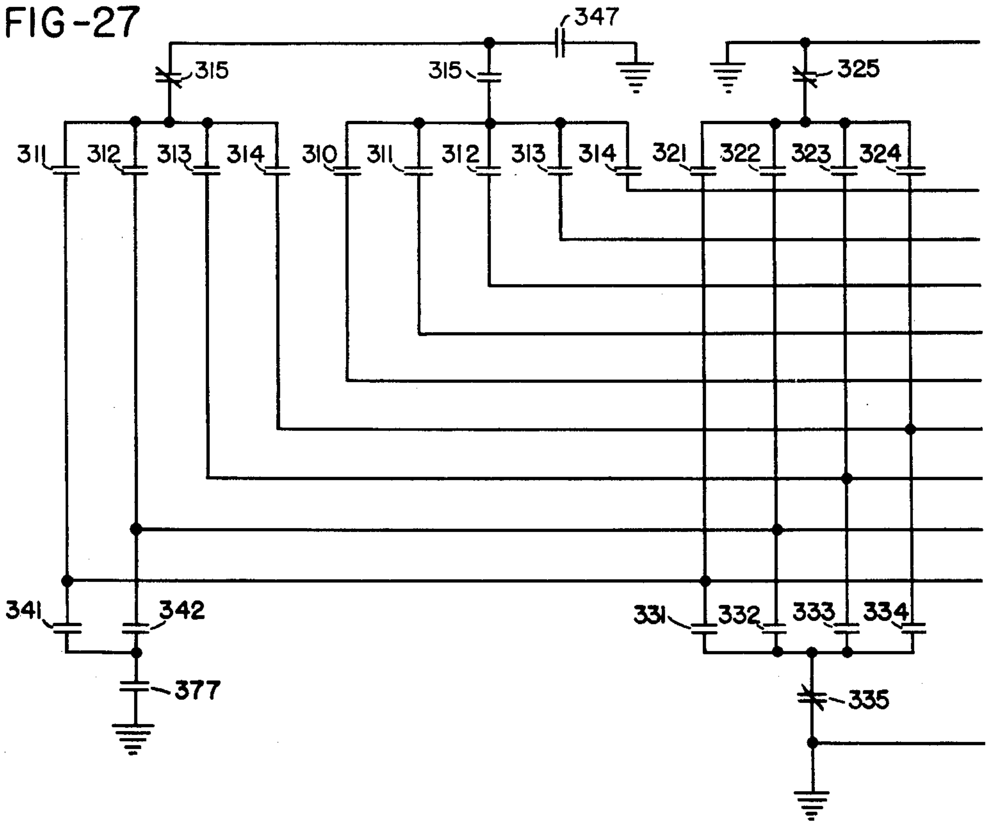
Figure 28:
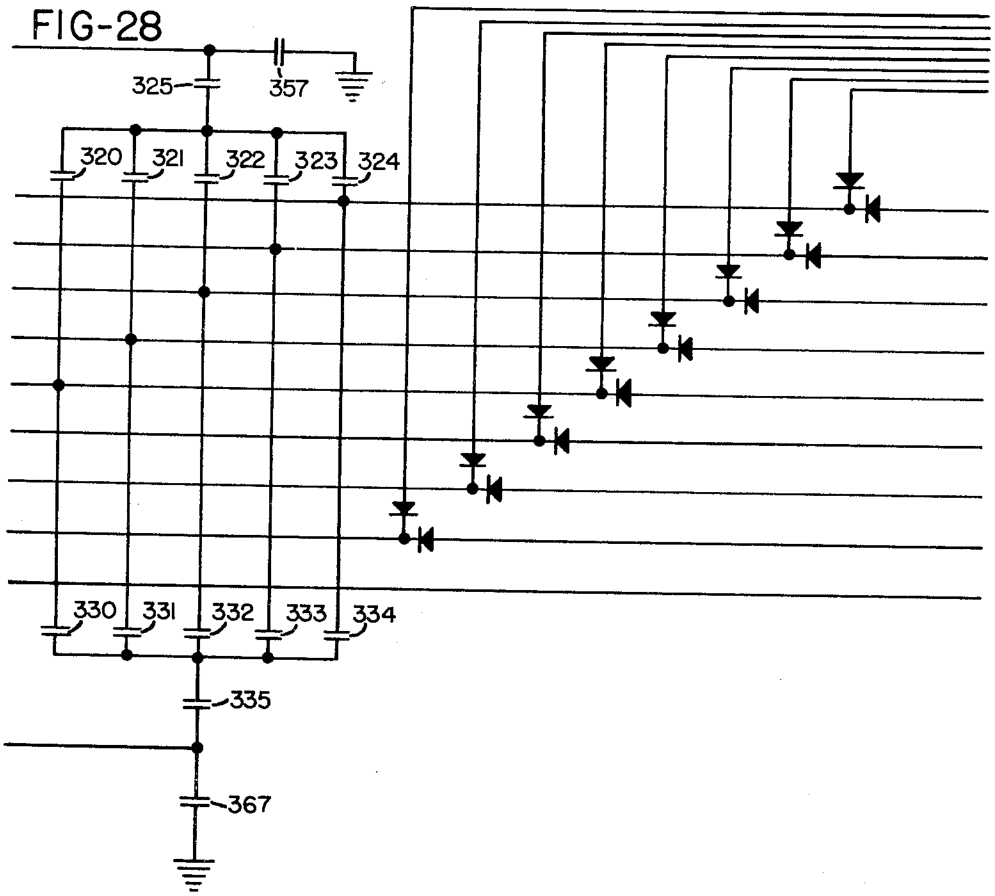

All of the selector switch wipers are assumed to be in the proper preset positions corresponding to the $1.26 price-per-pound selected for this example, and it will be understood that these switches are normally retained in each preset position for the weighing of a number of packages of the same commodity. In the drawings, however, the switches are all shown in their zero or deenergized positions. The operation of these switches to compute the price of each weighed load is initiated by the closing of relay 337 (FIG. 18), which is the relay controlling the mills column of computed value. Relay 337 closes through front contact of relay 346 and back contacts of relay 368 and the line 328 when relay 336 opens to provide power for relays 340–342, and relay 337 locks itself in and also closes relay 338 as shown in FIG. 26.

Figure 33:
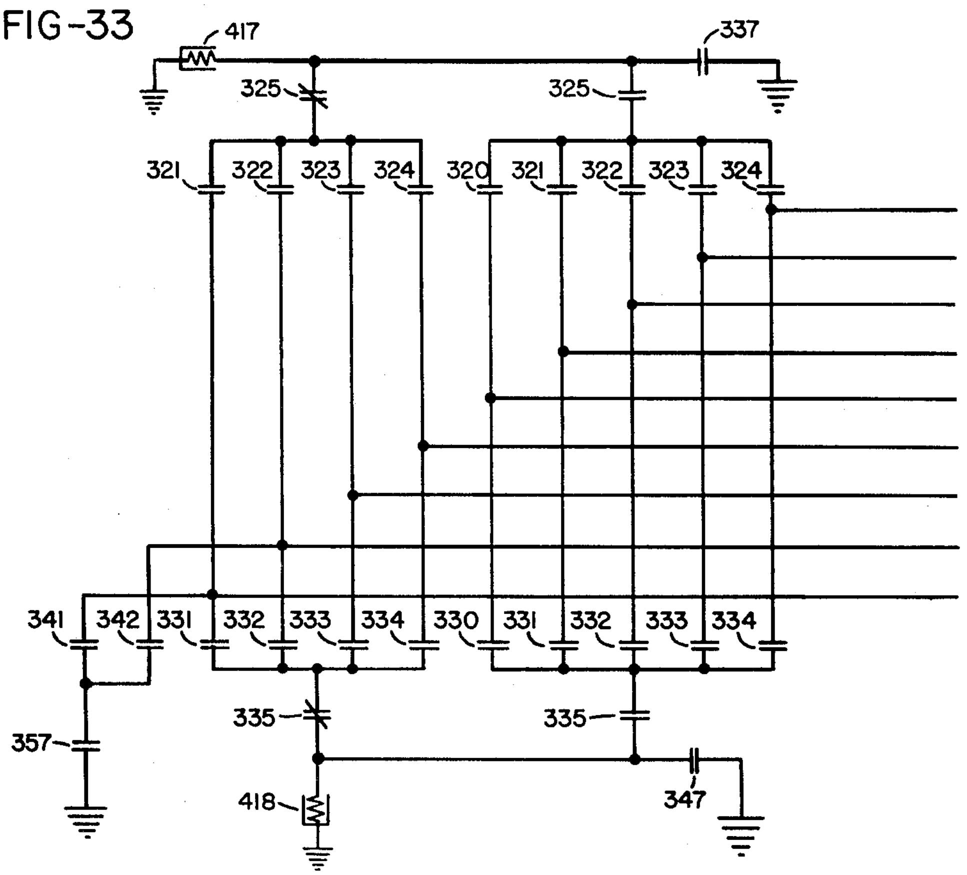
Figure 33:
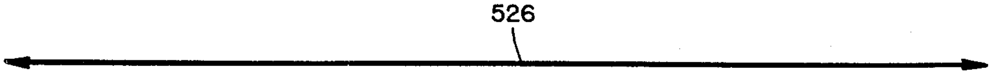
Figure 34:
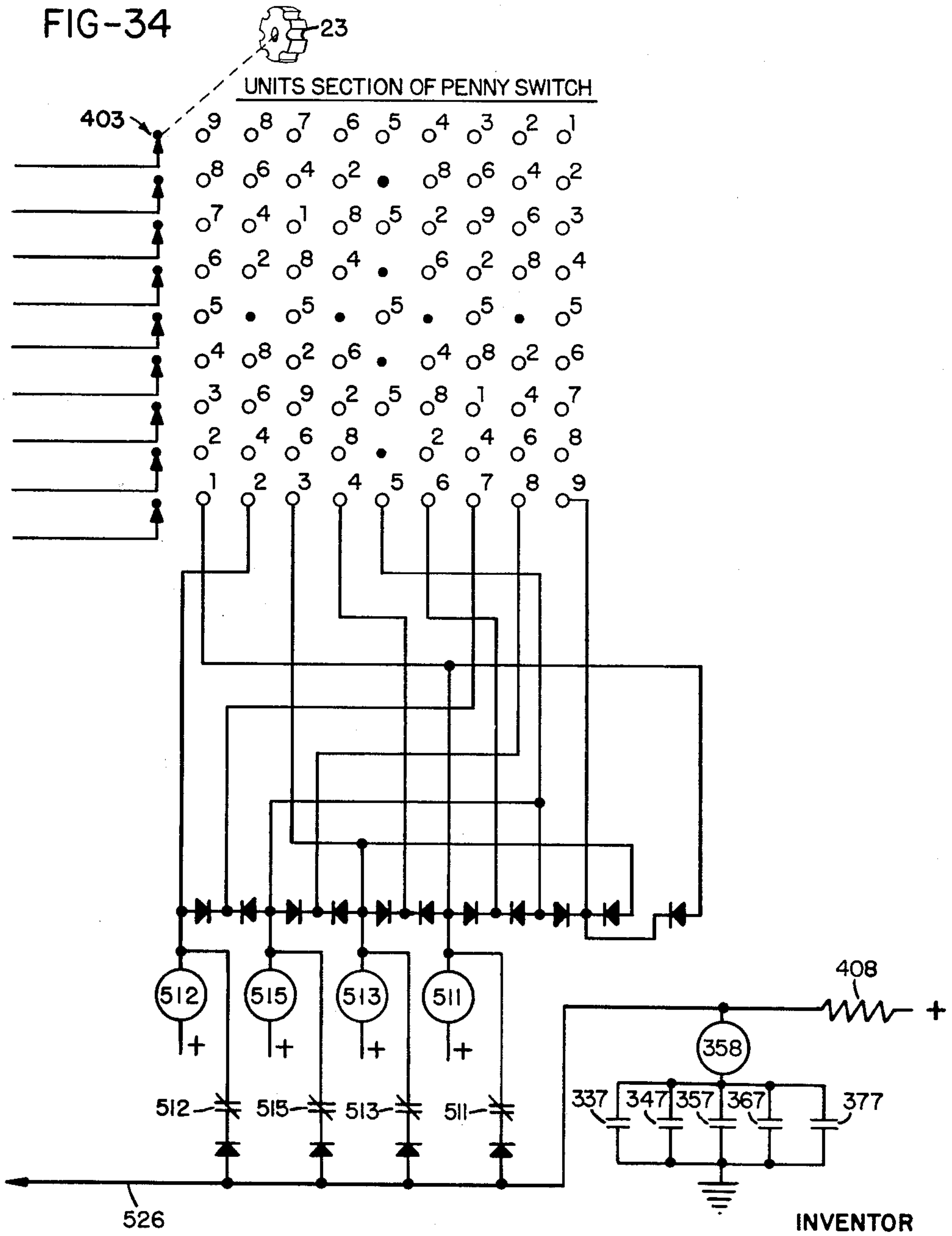
Figure 35:
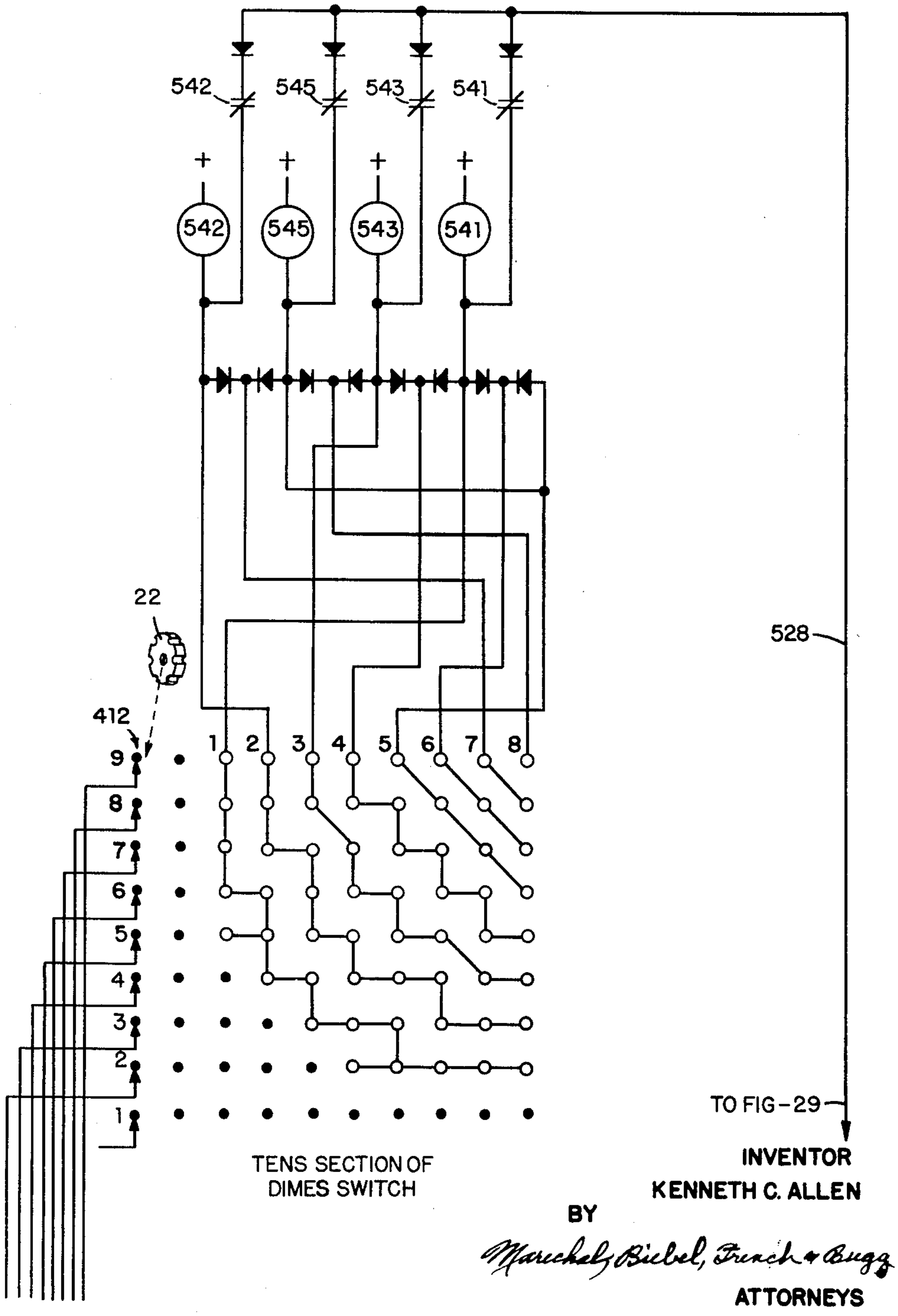

Closing of relay 337 applies a ground to relay 358 (FIG. 34) and also applies a ground through the relay contacts 320–325 to the series of wipers 403 of the units section of the penny switch as shown in FIGS. 33–34. Since both of relays 324 and 325 have been closed, this ground will reach the No. 9 wiper 403, which having been set in its "6" position is on a "4" contact. This ground connection will therefore reach the relays 511 and 513 to close both of these relays, but until they have closed, the ground is also applied through the back contacts of each of relays 511 and 513 to the upper side of relay 358 to prevent this relay from closing until after relays 511 and 513 have closed. The resistor 408 connected between relay 358 and the power supply protects against short circuiting during this interval.

FIG. 33 also shows the ground connection through the contacts of relay 337 as provided with a separate connection to ground through a spark suppressor 417. Similar spark suppressing connections may be provided at any desired similar locations in the wiring such as at 418 in FIG. 33, as will be understood by those skilled in the art, and have therefore been omitted from the diagram in the interest of simplicity.

Figure 32:
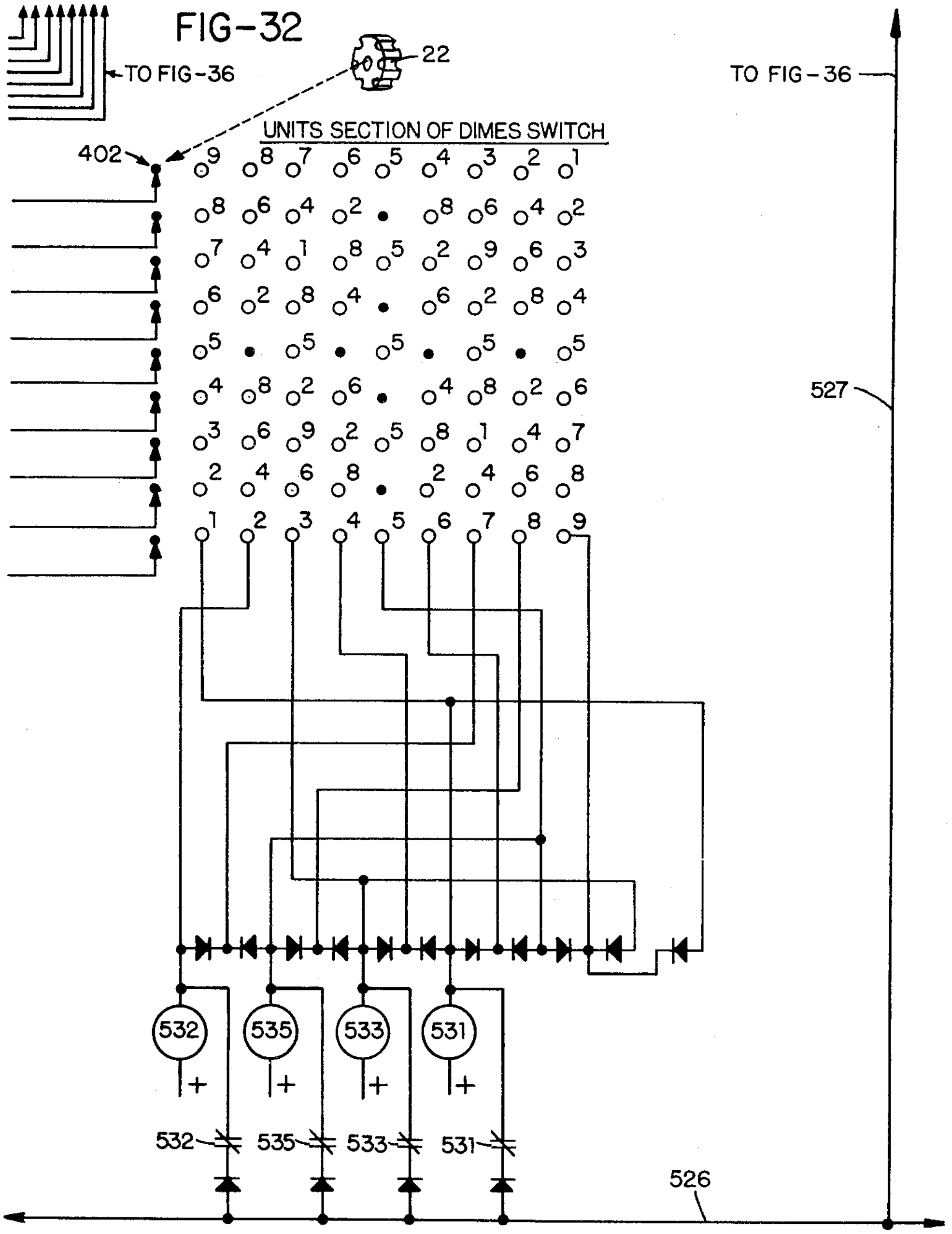

Closing of relay 337 also applies a ground (FIG. 30) through the series of relay contacts 310–315 to both the wipers 413 (FIG. 36) of the tens section of the penny switch and the wipers 402 (FIG. 32) of the units section of the dime switch. Since relays 315 and 311 are both closed, this ground will reach the No. 6 wiper 413, which is on a "3" contact, and this ground will therefore complete an energizing circuit for relay 523 (FIG. 36). Similarly the ground will reach the No. 6 wiper 412, which is on the "2" contact, and this will complete an energizing circuit for relay 532 (FIG. 32). However, as in the case of relays 511 and 513, the ground will also be applied through the back contacts of relay 523 and 532 and the lines 526 and 527 to the upper side of relay 358 until relays 523 and 532 have both closed, so that the closing of relay 358 will not occur until all of relays 511, 513, 523, and 532 have closed.

Figure 29:
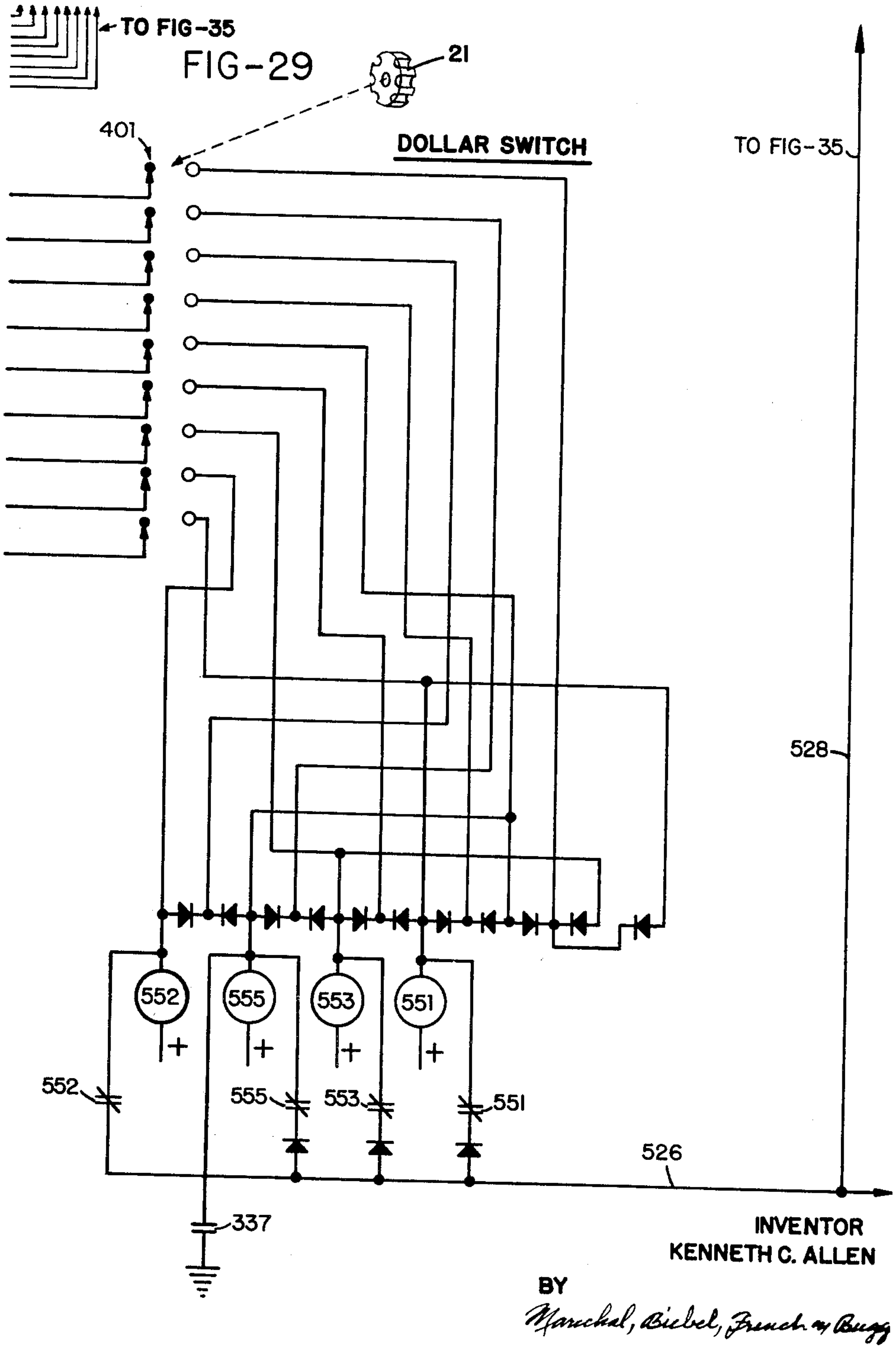
Figure 30:
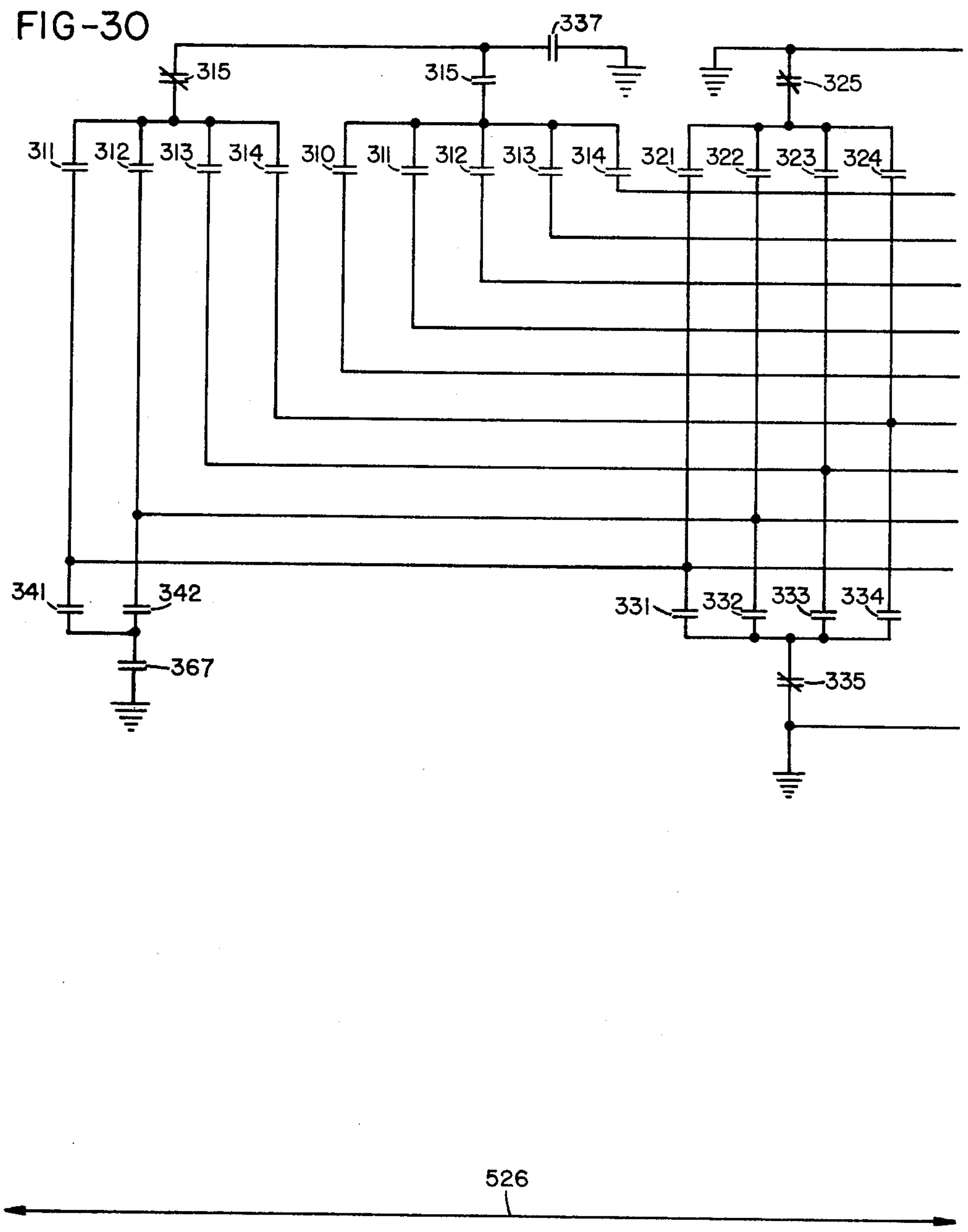
Figure 31:
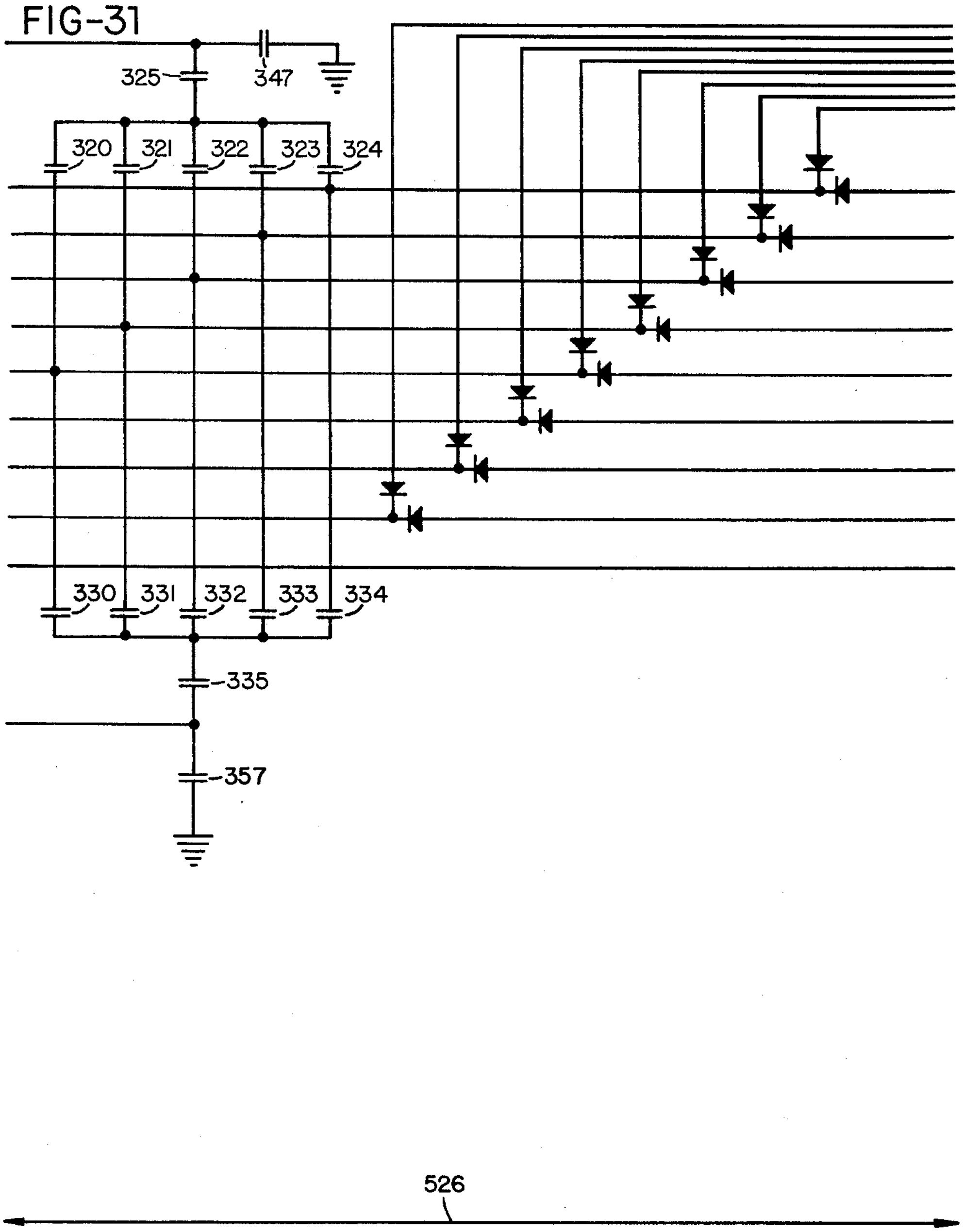

The computing system of the invention takes into account only total values in the mill column in excess of 4 mills, so that from 5 to 9 mills will be registered as one cent. This result is obtained by always adding 5 mills to the mill column, and this also is effected by the closing of relay 337 to complete an energizing circuit for relay 555 as shown in FIG. 29 before the relay 358 can close. It will therefore be seen that the relay 358 functions as a guarding relay for the series of partial product relays 511, 512, etc., to maintain the proper sequence of operation in that it does not close until all of the associated counting relays to which a ground has been applied have closed.

Figure 22:
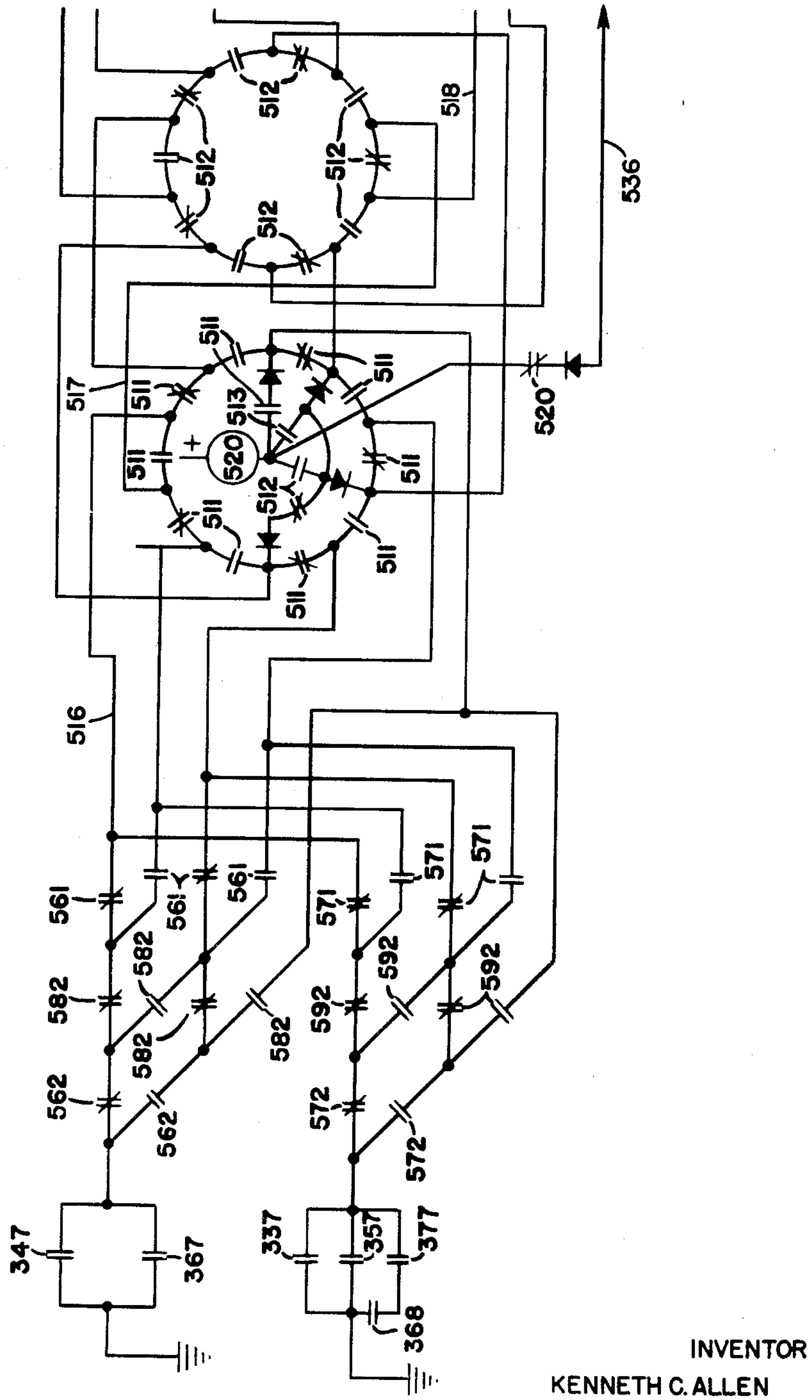
Figure 23:
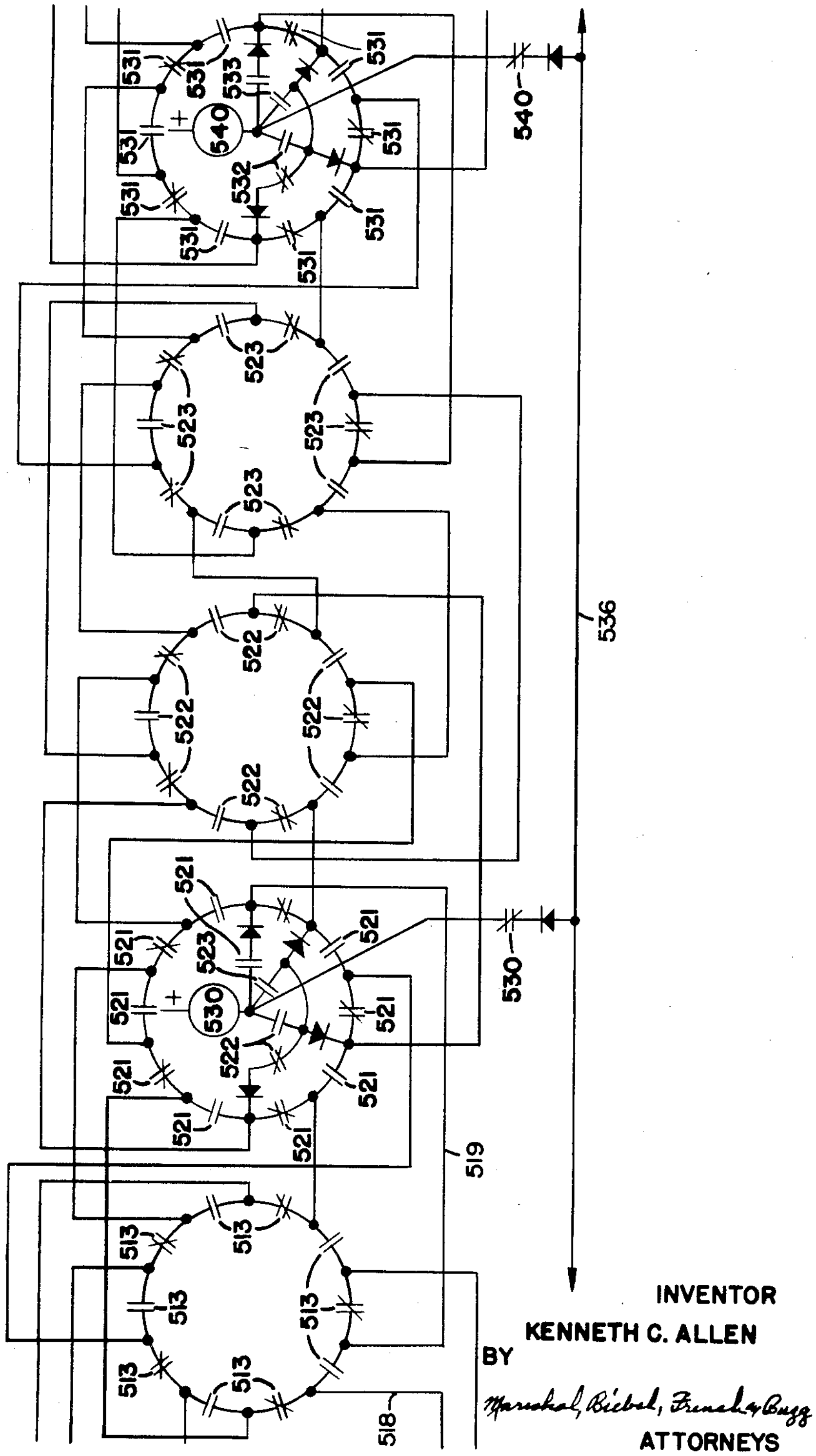
Figure 24:
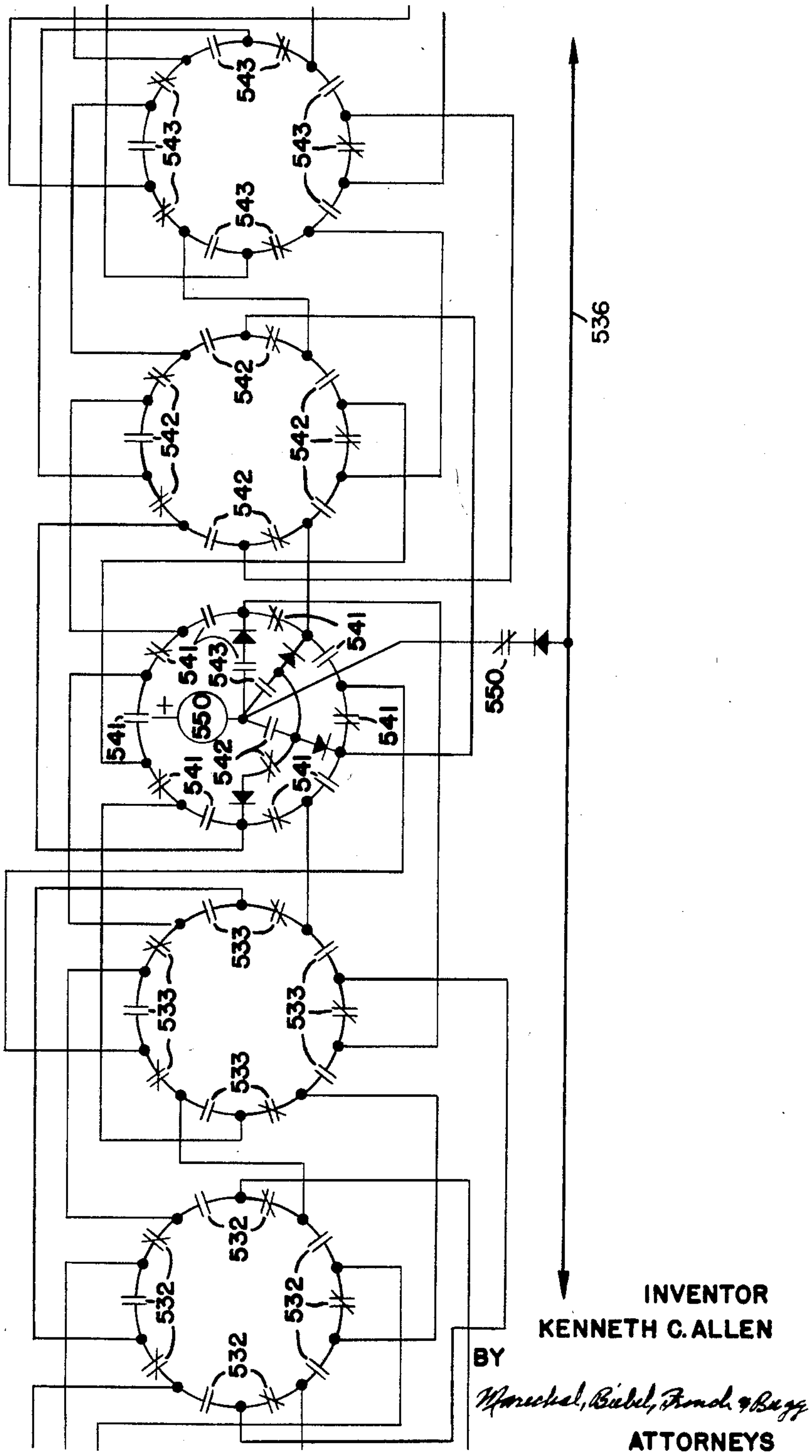

The several relays 511, etc., closed through the selector switches represent the partial products in the mill column, and their summation is also initiated by the closing of relay 337, through the ground which this places on the series of summation relays and relay contacts shown in FIGS. 22 to 25. Referring first to FIG. 22, this ground passes through the back contacts of relays 572, 592 and 571 and the line 516 to the ring of relay contacts 511. Since this relay has been closed, the ground passes on line 517 to the ring of relay contacts 512, and since this relay is open, the ground continues on line 518 to the ring of relay contacts 513 and then on line 519 to the ring of relay contacts 521. Relay 521 is open, but relay 523 has been closed, and therefore the ground passes inwardly of the ring to complete an energizing circuit for relay 530. This ground is free to continue through the remaining rings of relay contacts, but no further relay thereon would close, and it would ultimately appear on the line 390 leading to relay 350, but since there would as yet be no power available to that relay, it would remain open.

Figure 25:
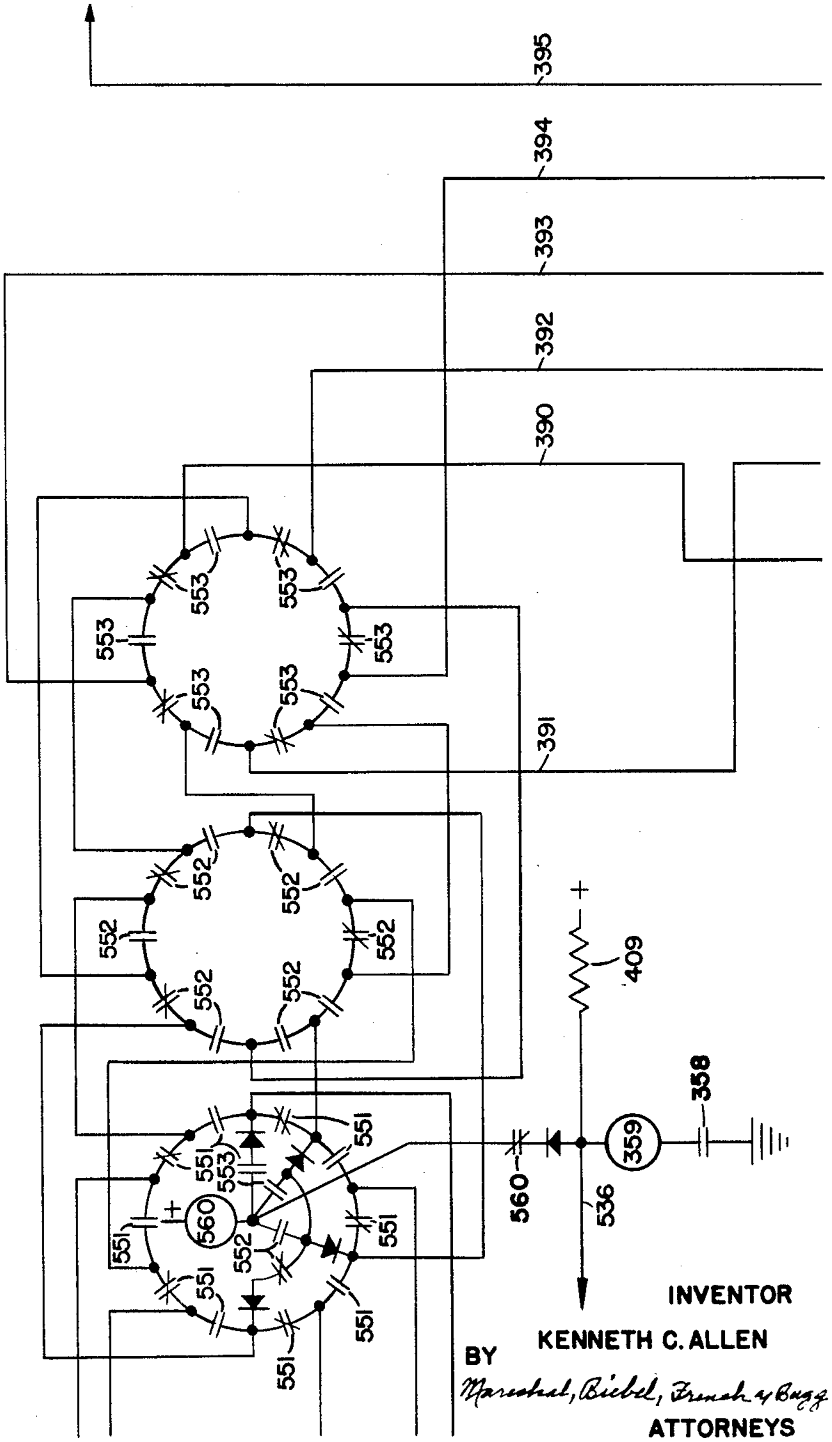

When relay 358 closed as described, this applies a ground to relay 359 as shown in FIG. 25, but the ground which fires relay 530 appears prior to the closing of this relay on the line 536 leading to the top of relay 359 to keep relay 359 from closing until relay 530 has closed. Therefore, the closing of relay 359 signifies completion of the setting up of all relays involved in the computation of the mill column, so that relay 359 is also a guarding relay similar in function to the relay 358 and is similarly provided with a resistor 409 (FIG. 25).

When relay 359 closes, it initiates operation of the circuits shown in FIG. 26 which count 5's and are described in detail in Case B. Referring to the upper right hand corner of FIG. 26, a ground is applied through the back contacts of relays 515, 520, and 525, the closed front contacts of relay 530, the back contacts of relays 535, 540, 545, and 550, the closed front contacts of relay 555 and the back contacts of relay 560 to the line 526. Since relay 338 has closed and since relay 339 closed in response to the closing of relay 359, an energizing circuit is complete for relay 561 through the positive line 527, and both of relays 339 and 561 lock themselves in.

At this point the mill column includes the partial product digits "2" (relay 532), "3" (relay 523), and "4" (relays 511 and 513), plus the added "5" from relay 555. This gives the total of 14 mills which provides one penny to be carried to the penny column, and it is this result which is stored by the energizing of relay 561, the remaining 4 mills being discarded.

Before proceeding with this description, it should be noted that while the readout of the pound switch 220 and the summation of the mill column have been described as occurring sequentially, these two operations are effectively simultaneous, and both must be completed before the cycle can proceed. More specifically, power becomes available simultaneously for the group of ten pound storage relays 340–342 and for the relay 337 when relay 336 opened at the conclusion of the readout of the pound switch 210. Relay 336 therefore functions as the sequencing relay for both of this next pair of operations, and relay 346 similarly has a multiple protective and sequencing function as now described.

In the first place, relay 346 has a protective action toward the relays 340–342 similar to that for the respective relays 316, 326 and 336, since one of its two parallel energizing circuits runs through back contacts of all of the relays 340–342 and it cannot open until one of these relays has been operated. Additionally, and referring to FIG. 26, when relays 339 and 359 are both closed, the relay 368 closes through the power line 327 and the closed front contacts of relay 359 in the upper right hand corner of FIG. 26, and relay 368 locks itself in through another pair of front contacts of relay 359. Relay 368 therefore has an overall guarding action with respect to the other guarding relays in the summation system, and its operation indicates completion of the summation sequence for the mill column and therefore readiness for initiation of the next summation sequence.

This function of relay 368 is effected by opening of its back contacts in the locking circuit for relay 346, so that relay 346 cannot open until the mill summation and the ten-pound readout have both been completed. Arrival at this stage in the cycle is then signaled to the scale by reason of the fact that opening of relay 346 breaks the last holding circuit for relay C. The scale is accordingly released to carry out the next weighing operation simultaneously with the remainder of the computing and printing cycle whenever the load on the platter is changed to break the energizing circuit for relay C through the sensing switch mechanism 115, and this could have already been done when relay 309 closed as previously described.

Relay 346 also functions as the sequencing relay for the several operations which are involved in summation of the pennies column. Thus when it opens, it breaks the locking circuit for the relay 337 and therefore drops out this relay. Opening of relay 337 drops out all of relays 338, 358, 511, 513, 523, 530, 532, and 555, and since opening of relay 358 opens relay 359, this in turn breaks the holding circuit for relay 368. Opening of relay 368 is also important in the sequencing action, since when relay 368 opens, it applies a ground through its back contacts in FIG. 18 to the line 329 to complete an energizing circuit through the back contacts of relay 337 and the front contacts of relay 356 for relay 347, and relay 347 locks itself in to initiate production of the partial products of the pennies column.

When relay 347 closes, it acts similarly to relay 337 to apply a ground to all of the switch wipers 401, 402, 403, 412 and 413. In view of the foregoing explanation, it is unnecessary to trace the resulting circuits beyond noting that the result is to energize relays 511, 513, 525, 533, 535, 541, 551 and 555 to give the respective partial product digits 4, 5, 8, 1 and 6 in the pennies column, and relay 358 functions as a guarding relay for all of these relays through the lines 526, 527 and 528. Additionally the Carry-5 relays 520 and 560 are closed, and a ground is applied through the remaining rings of relay contacts to the line 390 leading to the top of relay 350. Then when relay 368 closes as already described, relay 350 will energize through the front contacts of relays 347 and 368 and will remain energized and lock itself in for the remainder of the cycle.

Relay 338 does not close, and therefore when relay 359 closes, it causes relay 339 to drop out as shown in FIG. 26, by application of a ground to the power side of relay 339 through the closed back contacts of relay 338, a resistor 410 being connected between relay 339 and the power lines 327 to prevent a short circuit as already noted in connection with relay 358 and resistor 408. Closing of relay 359 ultimately applies a ground through the tree of relay contacts in FIG. 26 and the line 395 to relay 355, and this relay closes and like relay 350 locks itself in for the remainder of the complete cycle to store the digit "5" in the pennies column. The same ground applied to relay 355 is also applied through back contacts of relay 338 to relay 592 (FIG. 26), and when relay 339 opens as noted, the power line 527 is connected through the back contacts of relay 339 with relay 592 and causes this relay to close and lock itself in to store the Carry-2 higher order part of the sum of partial products in the pennies column. During this sequence, relay 561, which closed to store the "1" Carry from the mill column, remains closed through the back contacts of relay 338 which connect it with power line 527, and it causes this digit to be included in the summation of the pennies column by means of its closed front contacts in the left hand portion of FIG. 22.

In the summation for the pennies column, the relay 368 provides a guarding action against premature operation of relays 350–355 prior to proper operation of the groups of relays guarded by relays 358 and 359. Thus if an erroneous signal should reach any of relays 350–355 through the series of rings of relay contacts prior to operation of relays 358 and 359, it would still not be possible for any of relays 350–355 to operate until power is available thereto through the front contacts of relay 368 shown in the lower left-hand corner of FIG. 19, and relay 368 cannot close until relays 358 and 359 have been closed. The same guarding function of relay 368 affects relays 360–365 and 370–375 in similar manner, and also relays 380–384 through its front contacts shown in the lower left-hand corner of FIG. 22. An additional guarding action is provided by the circuits for storage relays 350–355 in the same manner as described for relays 310–316 in that whenever any of these relays should operate and fail to do so, they block the opening of relay 356 which initiates the next sequence.

Figure 19:
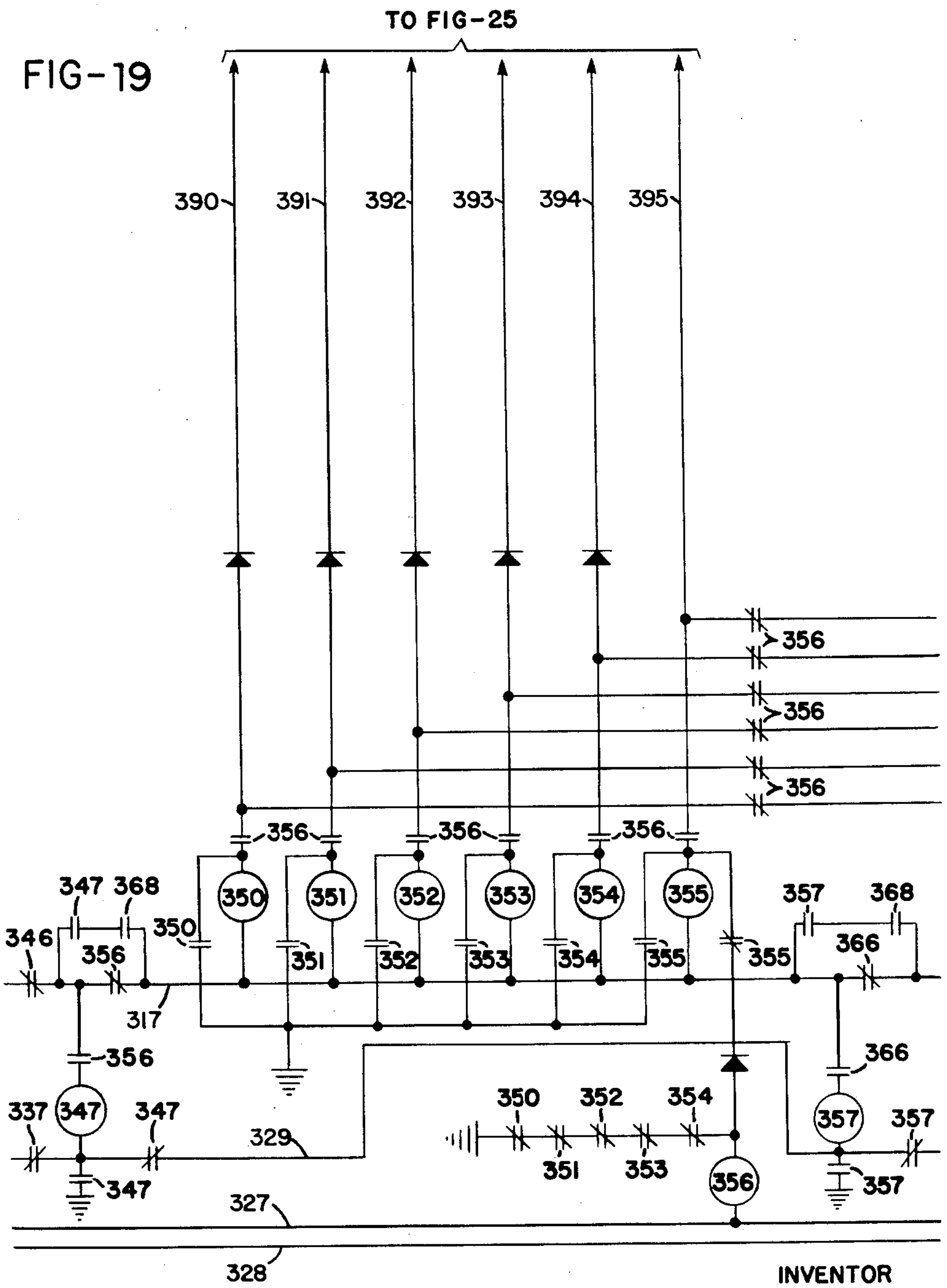
Figure 20:
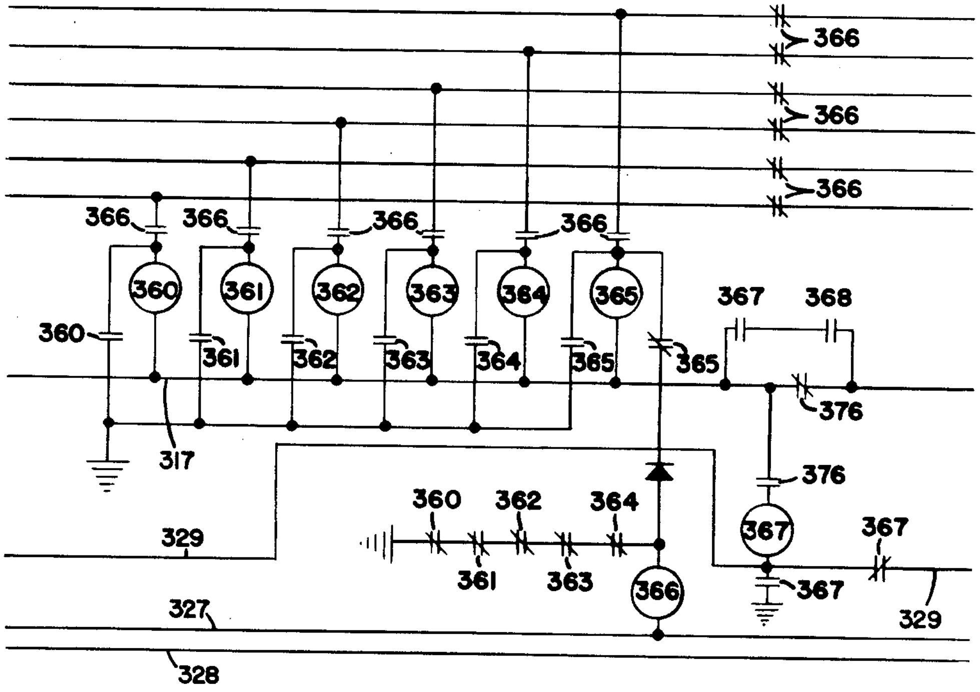
Figure 21:
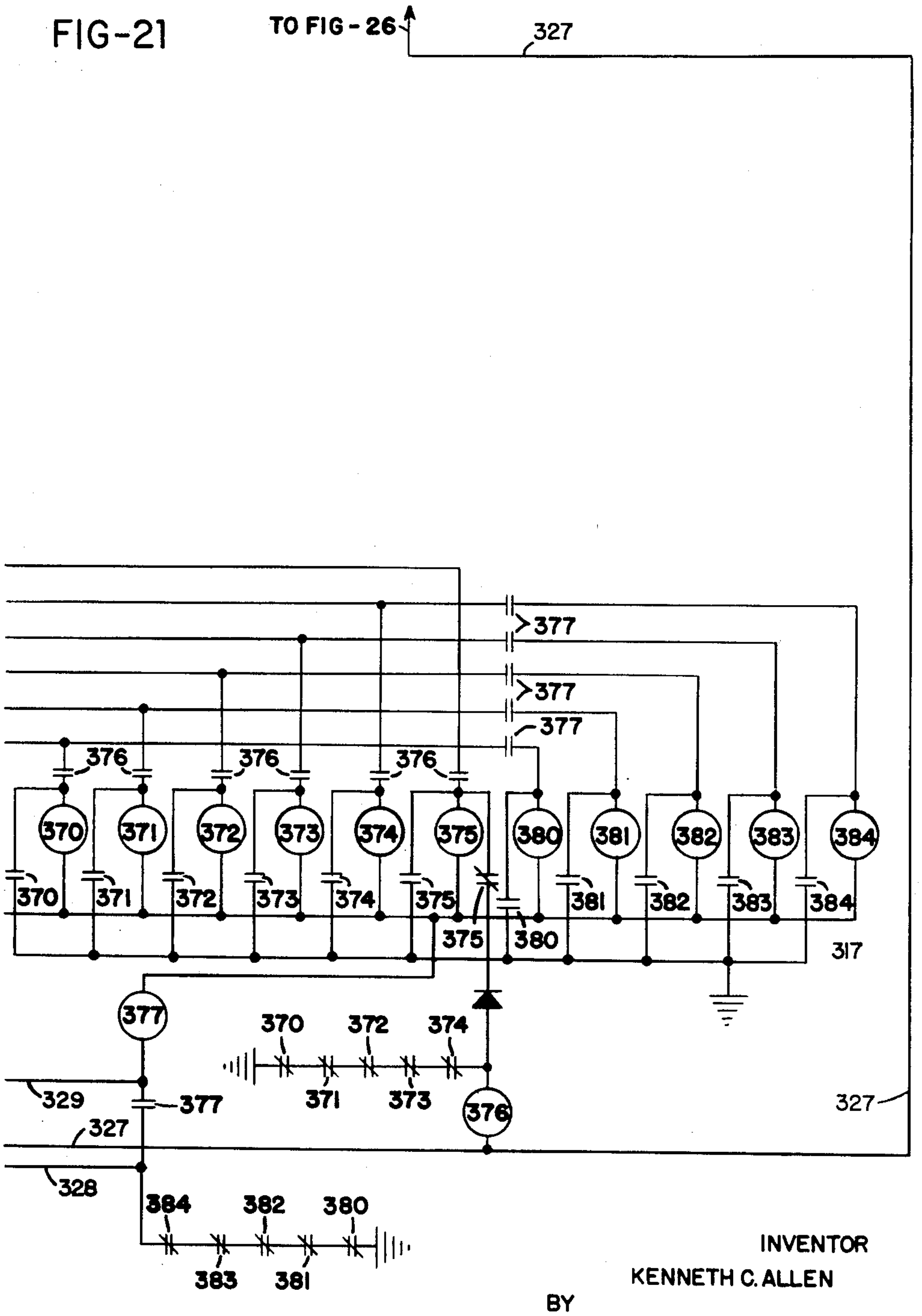

In the present example, when relays 350–355 close, relay 356 opens to drop out relay 347 and also to provide a parallel connection through its back contacts in the line 317 to maintain the power for relays 350 and 355 when relay 347 then opens, and it is also not until relay 356 opens that ground leads can be completed to any of relays 360–365, through the five pairs of back contacts of relay 356 controlling these leads in FIG. 19. Opening of relay 347 initiates a sequence similar to that following opening of relay 337 as already described, with the various adding and carrying relays dropping out until finally relay 357 (FIG. 19) is energized to initiate production of the partial products of the dimes column.

During this next portion of the cycle, partial product relays 511, 515, 522, 533, 535, 541, 551, 553 and 555 and Carry-5 relays 530 and 560 will be energized to give the partial product digits 6, 2, 8, 1 and 9 in the dime column. Relay 592 will perform the function of including its stored digit "2" in the summation for the dime column, but relay 561 will have dropped out when relays 338 closed in response to the closing of relay 357. After the adding and counting circuits are completed, storage relays 363 and 365 will have closed and locked in for the remainder of the cycle, and Carry-2 relay 582 will have been closed and temporarily locked in. This portion of the cycle is concluded by the opening of relay 357 followed by closing of relay 367 to initiate production of the partial products of the dollars column.

This next operation involves closing of relays 532, 551, 553 and 560 to give the partial product digits "2" and "4" in the dollars column, followed by the closing and locking of relays 373 and 375, but since there are no digits to carry over into the tens of dollars column, no additional relays in the 561–592 group close, and relay 592 opens when relay 338 closes during summation of the tens of dollars column. In the sequences involving the relay groups 360–366 and 370–376, the respective storage relay circuits provide essentially the same guarding actions as described above for relays 310–316 and 350–356.

Computation of the partial products for the tens of dollars column is initiated by the closing of relay 377 following opening of relays 366 and 367. The related group of storage relays numbers only five, namely relays 380–384, because with the stated limits of weight and price, the highest digit possible for this column is "4," but for higher such limits an additional relay would be added as in the other groups. Operation of relays 380–384 is controlled initially by the front contacts of relay 377 in the respective ground leads thereto, and since only one of relays 380–384 will be energized, operation of any one thereof will drop out relay 377 by breaking its ground connection at the bottom of FIG. 21. In the present example, there is only the single partial product digit "1" in this column, and therefore only partial product relay 551 (FIG. 29) closes to cause ultimate closing of relay 381 followed by opening of relay 377. This concludes operation of the computer but with the storage relays 311, 315, 324, 325, 334, 341, 350, 355, 363, 373, 375 and 381 remaining closed and locked.

Before proceeding with description of the next stage of operation of the system, attention is called to the alternating operation of the relays in the 561–592 group, which function alternately in two sub-groups first to receive the higher (tens) part of each partial product summation and then to cause that part of the sum to be included in the summation of the next group of partial products. Thus for the mill column, the relays 561, 562 and 582 are selectively energized individually or in pairs in accordance with the digit in the range from 1 to 4 which constitutes the higher order part of the sum of partial products in the mill column to be included for addition with the partial product for the pennies column. During computation of the pennies column, the relays 571, 572 and 592 similarly are selectively energized to store the higher order digit to be carried for inclusion in the dimes column. At the same time the previously energized ones of the relays 561, 562 and 582 are included in the summation of the pennies column by means of their contacts shown in FIG. 22 and then drop out when computation of the dimes column begins in time for selective re-energizing in accordance with whatever tens portion of the sum of partial products in the dimes column is to be included with the partial products in the dollars column, and so forth.

The relays 511–555 also have specifically allocated functional positions which are the same in all multiplication problems. Referring to the above specific example, there are five lines or horizontal rows of partial products, and each set of relays in this overall group is always related to the same line. Thus relays 511–515 always represent the partial products produced in the first row through the units section of the pennies switch, namely the digits "6," "4" and "4" in the example. The relays 521–525 always represent the partial products produced through the tens section of the pennies switch, which are the digits "2," "5" and "3" in the example. The relays 531–535 are similarly related to the units section of the dimes switch, and so forth.

When any of the relays 380–384 close, and in this example it will be relay 381 as described, this produces a signal for operation of the printer by applying a ground through the close front contacts of relays 381 and 309 to the relay 612 (FIG. 12) which corresponds in function to relay "530" in Case C. At this stage in the cycle, all of relays 601–608 in FIGS. 13–15 which correspond to the solenoids "285" in Case C and are all connected to ground, have been connected through contacts of the appropriate storage relays to one or another of the contacts 620 (FIG. 13) of the scanner 621, which corresponds to scanner "300" in Case C. As soon as relay 612 closes, it will complete an energizing circuit for relay 610 through the back contacts of relay 611 to start the printer motor, which is identified as 625 in FIG. 12, and operates ultimately to cause printing of the ticket as described in Case C by means of the printing wheels shown diagrammatically at 626 in FIG. 12.

The relays 610 and 611 correspond respectively to relays "160" and "543" in Case C. Energizing of relay 610 will be only momentary, since when it closes it will complete the energizing circuit for relay 611 and thus open the back contacts of that relay, but as described in Case C, the contacts of relay 610 are held closed mechanically by the printing mechanism until the printing cycle is completed. Closing of relay 612 also connects the scanner 621 to a positive power line so that as the scanner is driven into engagement successively with its contacts 620, the relays 601–608 are connected to power in a sequence determined by those storage relays in the 300 series which have remained energized.

The relays 601–608 represent in that order the successive four columns of weight and the successive four columns of value. The relays 601–604 will therefore be energized corresponding to the weight of 14.96 pounds, and the relays 605–608 will similarly be energized in accordance with the computed value of $18.85. Thus when relay 612 first closes and scanner 621 is on its "0" contact, none of the relays 601–608 will be energized. When the scanner reaches its "1" contact, relay 601 will be energized through the closed front contacts of relay 341, and relay 605 will be energized through the closed front contacts of relay 381. Similarly, relays 602 and 608 will energize when the scanner reaches its "4" contact, and so forth to effect setting of the printing wheels 626 for the proper weight and value as described in case C.

The original energizing circuit for relay 612 was through back contacts of relays 611 and 613 and closed front contacts of relays 309 and 381 and the error relay 348. Relay 609 corresponds to relay "560" in Case C and is closed upon the closing of relay 612 by a circuit which includes the back contacts of the manual reset switch 260 and parallel connections through the back contacts of each of relay 601–608, and relay 609 therefore remains closed until all of relays 601–608 have closed. Closing of relay 609 also closes a relay 613 which locks itself in through a mechanical switch 630 which corresponds to the switch "80" in Case D and must be operated at the end of each cycle in conjunction with the removal of each printed ticket before another printer cycle can begin.

After the scanner 621 reaches its "9" contact and before it starts to return, the cam-operated switch 624 (FIG. 13)

is opened as described in Case C. This breaks the locking circuit for relay 309 and that relay opens, thus causing relay 612 to open and thereby to break the power circuit to scanner 621 so that none of relays 601–608 will be energized during the return stroke of the scanner. In addition, opening of relay 309 closes its back contacts in the energizing circuit for relay 308 in preparation for the next cycle of the computer.

The final action in the complete cycle is the ejection of the printed ticket by the mechanism 25 as described in Case D, and the motor of that unit is represented at 635 in FIG. 12. This motor is started when relay 609 opens in response to the closing of all of relays 601–608, and it continues to run until relay 611 opens at the end of the printing cycle when the contacts of relay 610 open to drop out relay 611. As shown, however, relay 613 remains energized through its closed front contacts and the mechanical switch 630 and will therefore prevent relay 308 from being reclosed to start another computing cycle until switch 630 has been opened.

The error light 250 operates in conjunction with the error relay 348 to prevent improper operation of the computer or printer arising either from mechanical defects or improper action by the operator and to signal the existence of such improper conditions. Thus if the operator should attempt to change the price-per-pound setting while the computer is in operation, this will cause operation of the mechanical switch 623 (FIG. 18) and thus break the holding circuit for the error relay 348. This will prevent relay 612 from closing to start operation of the printer, and at the same time the error light 250 will be energized through the closed front contacts of relay 309 and the back contacts of relays 326 and 348. Additionally, relay 609 wil close and thereby cause relay 613 to close and lock itself in, and the back contacts of relay 613 in the energizing circuit for relay 308 will therefore be open to prevent recycling of the computer by closing of relay 308 before the error condition is corrected.

The same action will also occur as just described if the price selector knobs are not precisely set in whole digit positions or if the commodity key is changed without a subsequent change of the price setting, for the reasons pointed out in Case C. In any of these three cases, and provided switch 623 has been closed by correction of the error condition, correct operating conditions can then be established by operating the Reset switch 260 to release relays 309, 609 and 613 and then closing the starting switch 262 to close relay 308 for recycling of the computer. When the error condition requires changing of the price selector knobs, the light 251 will also be energized through the closed front contacts of switch 623 to indicate the particular error condition.

The error light 250 will light if the weight on the platter is greater than the capacity of the scale, as will be understood from an example wherein the weight is 26 pounds as compared with a maximum weight of 24.99 pounds for the scale. The digit "6" in the pounds column will result in closing of relays 331 and 335, and the digit "2" in the tens of pounds column will attempt to cause relay 342 to close. However, the prior closing of relay 335 will open its back contacts in the energizing circuit for relay 342 and will apply a ground through its front contacts to the power line which was holding error relay 348 closed. Relay 348 will therefore open to block operation of the printer and to cause light 250 to light as already described.

The error light 250 will also light if it is attempted to operate the computer and printer when the weight reading of the scale is less than zero. In that event, the actual setting of the weight read-out switches will correspond to 99.99 pounds, and when the computer attempted to read out the digit for the tens of pounds column, the wiper 221 and 222 would be on the "9" contact 225 which is directly connected to the "2" contact so that relay 342 would try to operate. However, since relay 335 would already have been operated, relay 342 could not operate for the reason already described, and instead the error relay 348 would be opened to cause lighting of the error light.

Provision is also made for interrupting operation and notifying the operator if any of the relays 601–608 should fail to close during operation of the computer. In that event, the relay 609 would remain closed, through the back contacts of whichever of relays 601–608 has remained open, and when relay 612 is opened by the opening of relay 309, it establishes a holding circuit for relay 609 which also causes the error light 250 to be energized through the back contacts of relay 612 and front contacts of relay 609. Since relay 609 also holds relay 613 closed, the back contacts of relay 613 in the energizing circuit of relay 308 will remain open to prevent the next cycle of the computer from starting. Correction of this condition is also effected by operation of the reset switch 260.

If a power failure should occur while the scale is in the weighing or computing cycles, no error will occur because all relays will drop out, and the complete cycle will automatically start over when the power is restored. However, if such power failure should take place during the printing cycle, an error will result because all of the storage relays will drop out but the front contacts of relay 610 will still be held closed mechanically, and when power is restored, the printer motor 625 will automatically resume operation and complete the interrupted printing cycle. At the same time, relay 611 will reclose through the held front contacts of relay 610 and thereby reclose relay 609 through the closed back contacts of relay 613, and relay 609 will lock itself in through the back contacts of relay 612. Since relay 612 will remain open because relays 308 and 348 remain open, the error light 250 will light, and also relay 613 will close through front contacts of relay 609 to block possible energizing of relay 308. The operator will therefore be warned that the resulting ticket is erroneous and must be discarded and another ticket printed, and this result is achieved by operation first of the reset switch 260, which results both in reclosing relay 611 and also in dropping out relay 609 and thereby completing the energizing circuit for the ejector motor 635. Then when switch 630 opens upon completion of the ejecting cycle, relay 613 will drop out, and since relays N and NR remain open, this completes the energizing circuit for relay 308 to start a complete new cycle of the system provided the same load is still on the platter.

In all of the above possible error conditions resulting in lighting of error light 250, the relay 609 will also be operated and will open its back contacts in the energizing circuit for ejector motor 635. Therefore, if the error has resulted in the printing of a defective ticket as described above, it will not be issued or ejected until the reset switch has been operated to reclose relay 611 and thereby to close its front contacts in the energizing circuit of motor 635. This requirement of manual operation of the reset switch under these conditions provides a further safeguard against accidental use of a defective ticket.

The repeat switch 261 may be operated manually to cause the printer to issue multiple successive identical tickets or labels for application to packages of a fixed weight. This switch is desirably of the toggle type, and when it is shifted from the position shown in FIGS. 12, 13 and 18, the initial operation of the apparatus is the same as previously described up to the point at which relay 613 is deenergized by operation of the mechanical switch 630. Thereupon an energizing circuit is completed for relay 309 through the back contacts of relays 308, 609, 612 and 613 and the closed front contacts of the repeat switch 261 in FIG. 13 to reclose relay 309 and thereby to recycle the printer without breaking the holding circuits for the closed storage relays in the 300 series.

This repeat operation will continue so long as switch 261 is closed provided switch 630 is operated after each ticket is printed. The repeat operation will terminate, however, if the price selector knobs are moved or a package of a different weight is placed on the platter. In the first case, the error relay would operate as already described to terminate operation, and the apparatus must be reset and then recycled by operation of switches 260 and 262. In the second case, when the load on the platter is removed and replaced, the resulting movement of the platter will close switch 55 and then reopen this switch when the new load is applied. This will first cause relay N to close and thereby to break the locking circuit for relay NR and then cause relay N to reopen and thereby to reclose its back contacts in the energizing circuit for relay 308. However, the back contacts of repeat switch 261 in this circuit are open, and the front contacts of the repeat switch in FIG. 18 are closed to complete the line 640 (FIGS. 12 and 18) between the energizing circuit of relay 308 and the top of error relay 348 and thereby to apply a ground on line 640 through the back contacts of relays N and NR. This will cause relay 348 to open and the error light to light, and it will therefore be necessary to reset and then to recycle the apparatus completely with the repeat switch 261 open before repeat operations can be resumed. The resistor 641 (FIG. 18) functions at this time to prevent short circuiting in the same manner as resistors 408–410 as previously described.

Reference is made to my copending applications Serial No. 822,836 and Serial No. 822,887, both filed June 25, 1959 as divisions of the present case.

While the forms of apparatus herein described constitute preferred embodiments of the invention, it is to be understood that the invention is not limited to these precise forms of apparatus, and that changes may be made therein without departing from the scope of the invention which is defined in the appended claims.

INDEX TABLE OF COPENDING APPLICATIONS

| Case | Inventor | Serial No. | Filing Date | Patent No. |
|---|---|---|---|---|
| A | Kenneth C. Allen | 376,136 | Aug. 24, 1953 | 2,948,523 |
| B | do | 436,218 | June 11, 1954 | 2,948,464 |
| C | do | 548,148 | Nov. 21, 1955 | 2,948,465 |
| D | Allen and Meeker | 561,336 | Jan. 25, 1956 | 2,948,466 |
| E | Kenneth C. Allen | 569,448 | March 5, 1956 | 2,873,416 |
| F | do | 637,756 | Feb. 1, 1957 | 2,921,780 |

What is claimed is:

1. An analogue to digital converter for reading out the position of a movable member in the form of a multi-digit number including a lower and a higher order digit respectively, comprising an output circuit including a plurality of contacts arranged in a sequence and corresponding to said higher order digits, a pair of wipers movable relative to said contacts with said movable member in spaced leading and trailing relation and adapted alternately to engage the same and then adjacent ones of said contacts in succession, adjacent said contacts being spaced by a distance greater than the width of each said wiper to prevent bridging thereof by the same said wiper, read out means associated with said movable member for reading out the position thereof over a range of positions in said lower order digits, said lower order read out means including a plurality of relays one of which is always unoperated when the reading of said read out means is in one half of its range and is always operated when said reading is in the other half of said range, and said one relay having back and front contacts respectively in circuit with said wipers and arranged to connect said leading wiper in said output circuit when said reading is in the lower half of said range and to connect said trailing wiper in said output circuit when said reading is in the upper half of said range.

2. An analogue to digital converter for reading out the position of a movable member in the form of a multi-digit number including a lower and a higher order digit respectively, comprising an output circuit including a plurality of contacts arranged in a sequence and corresponding to said higher order digits, a pair of wipers movable relative to said contacts with said movable member in spaced leading and trailing relation and adapted alternately to engage the same and then adjacent ones of said contacts in succession, adjacent said contacts being spaced by a distance greater than the width of each said wiper to prevent bridging thereof by the same said wiper, read out means associated with said movable member for reading out the position thereof over a range of positions in said lower order digits, said lower order read out means including a plurality of relays one of which is always unoperated when the reading of said read out means is in the lower half of its range and is always operated when said reading is in the upper half of said range, and said one relay having back contacts in circuit with said leading wiper and front contacts in circuit with said trailing wiper to connect said leading wiper in said output circuit when said reading is in the lower half of said range and to connect said trailing wiper in said output circuit when said reading is in the upper half of said range.

3. An analogue to digital converter for reading out the position of a movable member in the form of a decimal number including a lower and a higher order digit respectively, comprising an output circuit including a plurality of contacts arranged in a sequence and corresponding to said higher order digits, a pair of wipers movable relative to said contacts with said movable member in spaced leading and trailing relation and adapted alternately to engage the same and then adjacent ones of said contacts in succession, adjacent said contacts being spaced by a distance greater than the width of each said wiper to prevent bridging thereof by the same said wiper, read out means associated with said movable member for reading out the position thereof over a range of positions in said lower order digits, said lower order read out means including six relays corresponding respectively to the digits 0 to 5 and means for causing operation of said "5" relay whenever the reading of said read out means is in the upper half of its range, and said "5" relay having back contacts in circuit with said leading wiper and front contacts in circuit with said trailing wiper to connect said leading wiper in said output circuit when said lower order digit is in the range of 0 to 4 and to connect said trailing wiper in said output circuit when said lower order digit is in the range of 5 to 9.

4. An analogue to digital converter for reading out the position of a movable member, comprising a plurality of stationary contacts mounted in spaced sequential relation, an output circuit having a plurality of positions associated respectively with said contacts in predetermined numerical sequence, at least three movable contacts secured on said movable member in spaced relation for movement therewith into engagement with successive said stationary contacts, said movable contacts and said stationary contacts being predeterminedly different in their number and spacing such that none of said movable contacts can engage more than one of said stationary contacts at one time and in every position of said member at least one of said movable contacts will engage one of said stationary contacts but not more than two of said movable contacts will engage any of said stationary contacts, said movable contacts in engagement with two of said stationary contacts for connecting only one of said stationary contacts into said output circuit.

5. An analogue to digital converter for reading out the position of a movable member, comprising a plurality of stationary contacts mounted in spaced sequential relation, and equal in number to a multiple of ten, an output circuit having ten positions associated respectively with said stationary contacts in predetermined numerical sequence, a movable contact carrier secured on said movable member for movement therewith in face-to-face relation with said stationary contacts, a stationary plate mounted on the opposite side of said contact carrier, three movable contacts mounted in equi-spaced relation on said carrier in continuous engagement with said plate and adapted for movement with said carrier into engagement with successive said stationary contacts, the relative spacing of said movable contacts and said stationary contacts being such that none of said movable contacts can engage more than one of said stationary contacts at one time and in every position of said member at least one of said movable contacts will engage one of said stationary contacts but not more than two of said movable contacts will engage any of said stationary contacts, and means responsive to stopping of said member with two of said movable contacts in engagement with two of said stationary contacts for connecting only one of said stationary contacts into said output circuit.

6. An analogue to digital converter for reading out the position of a movable member in the form of a multi-digit number including three orders of digits, comprising a pair of output circuits each including a plurality of contacts arranged in a sequence and corresponding respectively to the middle and highest orders of said digits, a separate pair of wipers associated with each said plurality of contacts and movable relative thereto with said movable member in spaced leading and trailing relation and adapted alternately to engage the same and then adjacent ones of said associated contacts in succession, adjacent said contacts being spaced by a distance greater than the width of each said associated wiper to prevent bridging thereof by the same said wiper, read out means associated with said movable member for reading out the position thereof over a range of positions in said lower order digits and including one relay which is always in one of its two positions when said reading is below the mid-point of its range and is always in its other position when said reading is above said mid-point, means controlled by said one relay for selectively connecting one only of said wipers in said middle order digit output circuit to assure selection of the proper said middle order digit, read out means associated with said middle order digit wipers for reading out said middle order digit and including another relay which is always in one of its two positions when said digit is below the mid-point of its range and is always in its other position when said digit is above said mid-point, and means controlled by said other relay for selectively connecting one only of said wipers in said higher order digit output circuit to assure selection of the proper said higher order digit.

7. An analogue to digital converter for reading out the position of a movable member in the form of a multi-digit number including three orders of digits, comprising a pair of output circuits each including a plurality of contacts arranged in a sequence and corresponding respectively to the middle and highest orders of said digits, a separate pair of wipers associated with each said plurality of contacts and movable relative thereto with said movable member in spaced leading and trailing relation and adapted alternately to engage the same and then adjacent ones of said associated contacts in succession, adjacent said contacts being spaced by a distance greater than the width of each said associated wiper to prevent bridging thereof by the same said wiper, read out means associated with said movable member for reading out the position thereof over a range of positions in said lower order digits and including one relay which is always unoperated when said reading is below the mid-point of its range and is always operated when said reading is above said mid-point, said one relay having back and front contacts respectively in circuit with said leading and trailing wipers in said middle order digit output circuit to assure selection of the proper said middle order digit, read out means associated with said middle order digit wipers for reading out said middle order digit and including another relay which is always unoperated when said digit is below the mid-point of its range and is always operated when said digit is above said mid-point, and said other relay having back and front contacts respectively in circuit with said leading and trailing wipers in said higher order digit output circuit to assure selection of the proper said higher order digit.

8. An analogue to digital converter for reading out the position of a movable member in the form of a decimal number including three orders of digits, comprising a pair of output circuits each including a plurality of contacts arranged in a sequence and corresponding respectively to the middle and highest orders of said digits, a separate pair of wipers associated with each said plurality of contacts and movable relative thereto with said movable member in spaced leading and trailing relation and adapted alternately to engage the same and then adjacent ones of said associated contacts in succession, adjacent said contacts being spaced by a distance greater than the width of each said associated wiper to prevent bridging thereof by the same wiper, read out means associated with said movable member for reading out the position thereof over a range of positions in said lower order digits and including six relays corresponding respectively to the digits 0 to 5 and means for causing operation of said "5" relay whenever the reading of said read out means is in the range of 5 to 9, said "5" relay having back and front contacts respectively in circuit with said leading and trailing wipers in said middle order digit output circuit to assure selection of the proper said middle order digit, read out means associated with said middle order digit wipers for reading out said middle order digit and including a second set of six relays corresponding respectively to the digits 0 to 5 and means causing operation of said second "5" relay whenever said middle order digit is in the range of 5 to 9, and said second "5" relay having back and front contacts respectively in circuit with said leading and trailing wipers in said higher order digit output circuit to assure selection of the proper said higher order digit.

References Cited in the file of this patent

UNITED STATES PATENTS

| | | |
|---|---|---|
| 2,040,071 | Brendel | May 12, 1936 |
| 2,615,624 | Brand et al. | Oct. 28, 1952 |
| 2,666,912 | Gow | Jan. 19, 1954 |
| 2,679,644 | Lippel et al. | May 25, 1954 |
| 2,719,005 | Lackey | Sept. 27, 1955 |
| 2,730,698 | Daniels et al. | Jan. 10, 1956 |
| 2,750,584 | Goldfischer | June 12, 1956 |
| 2,766,445 | Bland | Oct. 9, 1956 |
| 2,766,981 | Lauler et al. | Oct. 16, 1956 |
| 2,809,369 | Feeney | Oct. 8, 1957 |
| 2,813,677 | Scarbrough | Nov. 19, 1957 |